United States Patent
Nieto et al.

(10) Patent No.: US 12,208,449 B2
(45) Date of Patent: Jan. 28, 2025

(54) 3D PRINTED OXIDE REINFORCED TITANIUM COMPOSITES AND METHODS

(71) Applicant: The United States of America, as represented by the Secretary of the Navy, Arlington, VA (US)

(72) Inventors: Andy Nieto, Fremont, CA (US); Andrew James Reinhart, Goose Creek, SC (US); Troy Y Ansell, Marina, CA (US); Walter Smith, Monterey, CA (US)

(73) Assignee: The Government of the United States of America, as represented by the Secretary of the Navy, Arlington, VA (US)

( * ) Notice: Subject to any disclaimer, the term of this patent is extended or adjusted under 35 U.S.C. 154(b) by 0 days.

(21) Appl. No.: 17/736,883

(22) Filed: May 4, 2022

(65) Prior Publication Data

US 2023/0027624 A1     Jan. 26, 2023

Related U.S. Application Data

(60) Provisional application No. 63/184,181, filed on May 4, 2021.

(51) Int. Cl.
    *B22F 10/47*     (2021.01)
    *B22F 9/04*     (2006.01)
    (Continued)

(52) U.S. Cl.
    CPC ........... *B22F 10/47* (2021.01); *B22F 9/04* (2013.01); *B22F 10/28* (2021.01); *B33Y 10/00* (2014.12);
    (Continued)

(58) Field of Classification Search
    CPC ...... B22F 9/04; B22F 2009/043; B22F 10/28; B22F 10/47; B22F 2301/205; B22F 2302/253; C22C 32/0031
    See application file for complete search history.

(56) References Cited

U.S. PATENT DOCUMENTS

| | | | | |
|---|---|---|---|---|
| 2010/0124514 | A1* | 5/2010 | Chelluri | B22F 1/052 419/33 |
| 2016/0002471 | A1* | 1/2016 | Peng | B22F 1/14 427/216 |

(Continued)

FOREIGN PATENT DOCUMENTS

| | | | | |
|---|---|---|---|---|
| CN | 110735065 A | * | 1/2020 | |
| FR | 3037945 A1 | * | 12/2016 | ............ B22F 3/1055 |

OTHER PUBLICATIONS

Boytsov, O., et al. "Correlation between milling parameters and microstructure characteristics of nanocrystalline copper powder prepared via a high energy planetary ball mill." Journal of Alloys and Compounds 432.1-2 (2007): 103-110. (Year: 2007).*

(Continued)

*Primary Examiner* — Sally A Merkling
*Assistant Examiner* — Sean P. O'Keefe
(74) *Attorney, Agent, or Firm* — Heber Martin Carbajal Chavez; Scott Bell

(57) ABSTRACT

This disclosure, and the exemplary embodiments provided herein, include AM processed Ti-MMCs reinforced with either aluminum oxide or tantalum pentoxide. According to an exemplary embodiment, composite feedstock powders of Ti-6Al-4V (Ti64) with 1% and 3% (by volume) reinforcements of either nano-$Al_2O_3$ or $Ta_2O_5$ are prepared by high energy ball milling and then 3-D printed using SLM.

17 Claims, 12 Drawing Sheets
(1 of 12 Drawing Sheet(s) Filed in Color)

(51) Int. Cl.
B22F 10/28 (2021.01)
B33Y 10/00 (2015.01)
B33Y 70/10 (2020.01)
C22C 32/00 (2006.01)

(52) U.S. Cl.
CPC ......... *B33Y 70/10* (2020.01); *B22F 2009/043* (2013.01); *B22F 2301/205* (2013.01); *B22F 2302/253* (2013.01); *B22F 2304/10* (2013.01); *C22C 32/0031* (2013.01)

(56) References Cited

U.S. PATENT DOCUMENTS

| | | | | |
|---|---|---|---|---|
| 2018/0086004 | A1* | 3/2018 | Van Espen | B29C 64/393 |
| 2018/0214949 | A1* | 8/2018 | Martin | B22F 1/056 |
| 2020/0055118 | A1* | 2/2020 | Djemai | B33Y 70/10 |
| 2020/0254519 | A1* | 8/2020 | Jones | B29C 64/393 |
| 2021/0260650 | A1* | 8/2021 | Colon | C22C 21/12 |

OTHER PUBLICATIONS

Fathinia, Siavash, et al. "Preparation of natural pyrite nanoparticles by high energy planetary ball milling as a nanocatalyst for heterogeneous Fenton process." Applied Surface Science 327 (2015): 190-200. (Year: 2015).*

Kumar, Ajeet, et al. "Optimization of poling parameters of mechanically processed PLZT 8/60/40 ceramics based on dielectric and piezoelectric studies." The European Physical Journal B 88 (2015): 1-9. (Year: 2015).*

T. Wohlers, "History of additive manufacturing," Wohlers Report, vol. 24, No. 2014, p. 118, 2014.

Conteo AG, "Laser Sintering (LS)," Additively, 2020. [Online]. Available: https://www.additively.com/en/learn-about/laser-sintering. [Accessed Sep. 2019].

S. Rafi, ""Microstructures and mechanical properties of Ti6Al4V parts fabricated by selective laser melting and electron beam melting.","  Journal of Materials Engineering and Performance 22, No. 12, pp. 3872-3883, 2013.

T. D. Ngo, "Additive manufacturing (3D printing): A review of materials, methods, applications and challenges," Composites Part B: Engineering, vol. 143, pp. 172-196, 2018.

T. Clyne and P. Withers, An introduction to metal matrix composites, Cambridge University Press, 1995.

Endeavor Business Media LLC, "Metal-Matrix Composites," Machine Design, Nov. 15, 2002. [Online]. Available: https://www.machinedesign.com/materials/article/21812641/metalmatrix-composites.

A. V. Rane, "Methods for synthesis of nanoparticles and fabrication of nanocomposites," in Synthesis of Inorganic Nanomaterials, Elsevier, 2018, pp. 121-139.

Malcolm Ward-Close, "Titanium metal matrix composites," in Aerospace Materials, Boca Raton, CRC Press, 2001, pp. 241-252.

M. D. Hayat, "Titanium metal matrix composites: An overview," Composites, vol. 121, pp. 418-438, 2019.

C. Leyens, "Continuous fiber reinforced titanium matrix composites: fabrication, properties, and applications," Advanced Engineering Materials, vol. 5, No. 6, pp. 399-410, 2003.

B. McWilliams, "Mechanical response of discontinuous ceramic fiber reinforced metal matrix composites under quasi-static and dynamic loadings," Materials Science and Engineering: A, vol. 590, pp. 21-29, 2014.

National Research Council, Metal-Matrix Composites: Status and Prospects, Washington, DC: The National Academies Press, 1974.

W. Koop, "Metal matrix composites structural design experience," in 26th Joint Propulsion Conference, Orlando, 1990.

S. Luo, "Recent Advances in the Design and Fabrication of Strong and Ductile (Tensile) Titanium Metal Matrix Composites," Advanced Engineering Materials, vol. 21, No. 7, p. 1801331, 2019.

A. S. Namini and M. Azaadbeh, "Microstructural characterisation and mechanical properties of spark plasma-sintered TiB2-reinforced titanium matrix composite," Powder Metallurgy, vol. 60, No. 1, pp. 22-32, 2017.

* cited by examiner

3D PRINTED OXIDE REINFORCED TITANIUM COMPOSITES AND METHODS

CROSS REFERENCE TO RELATED PATENT(S) AND APPLICATION(S)

This application claims the benefit of U.S. Provisional Application No. 63/184,181 filed May 4, 2021, and entitled 3D PRINTED OXIDE REINFORCED TITANIUM COMPOSITES, which is hereby incorporated in its entirety by reference.

BACKGROUND

The present exemplary embodiment relates to 3D PRINTED OXIDE REINFORCED TITANIUM COMPOSITES. It finds particular application in conjunction with methods to generate oxide reinforced titanium composites and printing using said composites using a custom support structure, and will be described with particular reference thereto. However, it is to be appreciated that the present exemplary embodiment is also amenable to other like applications.

In traditional manufacturing, parts are made from raw metal through subtractive processes that use machinery such as a mill or a lathe to cut away unwanted material and thereby obtain a desired shape. In additive manufacturing (AM), parts are built from a raw material powder or liquid that is built up layer by layer until an entire piece has been completed.

AM was first used on the commercial scale in 1987 with the advent of stereolithography (STL) machines. These devices utilized a laser to cure thin layers of ultraviolet-sensitive liquid polymer and create a solid structure. This novel technique offered many advantages over traditional manufacturing and led to the desire to use AM on metals in addition to plastics. In 1992, selective laser melting machines (SLM) were developed for commercial use, which allowed for the AM of metal powders. SLM is a process where metal powder is deposited on a build plate, then melted in a fast pass by a high energy laser. Once the melted powder has fused, another layer of powder is coated onto the build plate and this process is repeated.

SLM was originally commercially used as a way to conduct rapid prototyping (RP). In rapid prototyping, a company creates models of a completed part with no intention of using this same manufacturing method for mass production. Rapid prototyping is conducted to facilitate visualization of the product for both the design team and the potential customers, and to help to detect potential problems ahead of mass production.

After two decades of AM, AM is no longer solely used for RP. Enough research and production have been conducted such that parts have begun to be built for use in load bearing applications. Companies such as General Electric have begun development of AM components for use in applications such as gas turbine engines, and the novel building process has resulted in higher efficiencies through complex new geometries for everything from heat shields to turbine engines [4]. Specifically, additive manufacturing of the titanium-aluminum-vanadium alloy Ti-6Al-4V has dramatically increased as laser sintering technology expanded. This is particularly important for aerospace applications as Ti-6Al-4V has a high strength to weight ratio, and has excellent corrosion resistance at high temperatures like those experienced in a gas turbine engine [5]. AM will continue to expand to be used in a wider variety of high-end applications as the mechanical properties of 3-D printed parts continue to improve.

AM offers more freedom than traditional manufacturing as it is not limited to the precision of machining tools, casts, welds, or other manufacturing techniques. Because parts are built layer by layer, they can be designed to have complex internal geometry than would be possible with a traditional manufacturing method. This presents opportunities to reduce a structure's overall weight, which can be critical in many applications. Additionally, internal structures can have specific designs to manage heat loss, or increase airflow, or perform countless other functions.

Because AM produces parts one at a time, individual builds can be highly customized to suit the intended application. This contrasts with traditional manufacturing techniques such as casting, as parts would be limited to the molds available and it would be uneconomical to make a different mold for every part. Furthermore, a single AM machine could theoretically produce parts that would normally require multiple traditional manufacturing machines and long work hours from a machinist. In this way, AM can be both a cost-saving measure and a space-saving measure if it eliminates the need for an entire machine shop. Mass customization also has increasing importance in both commercial and military applications as traditional manufacturing has declined in the 21st century; many legacy systems are no longer in production and replacement parts are no longer available. One AM machine could create replacements on an as-needed basis, allowing for continued operation of legacy platforms. This could reduce or eliminate the requirement for a supply chain and offers potential to build parts on site—a promising feature when replacements could be needed quickly—at a forward operating base, at sea, or in a space application; areas logistically difficult or impossible to reach.

One of the chief benefits of developing new techniques with AM is that they can quickly be put into production. Typically, the time between materials development, implementation, and full-scale production can span years if not decades. As mentioned in the general background of AM section, one of the first uses of AM was RP. This is because AM allows for much faster creation of parts than traditional manufacturing. For this same reason, new techniques using as novel materials, laser beam rastering speeds, different shapes of laser beams, and other machine parameters can quickly get put into use at the commercial level as AM is by design highly adaptable. A newly created metal powder with better mechanical properties or a new laser optimization could theoretically go from design and testing to commercial use in the time frame of months to years instead of years to decades with traditional manufacturing. This is part of why the scientific interest in AM is as high as it currently is—if novel materials are developed for AM, they have increased viability for commercial use as the cost of adapting to employ the new materials is low.

Titanium alloys are often used for their superior mechanical properties when compared to other aluminum, nickel, or steel alloys. In particular, the main reasons for using titanium are to reduce weight and size, allow for use at higher operating temperatures, increase corrosion resistance, and titanium's high degree of compatibility with composite materials from a galvanic standpoint. Titanium alloys can provide significant weight savings, as titanium has a much higher strength-to-weight ratio. Steel may have a higher strength than titanium, but its much greater density makes it weight prohibitive in many aerospace applications. Titanium has a greater density than aluminum, but its significantly higher strength means that less material can be used, and substantial space savings can be achieved when compared to an aluminum structure bearing the same load. Titanium has a superior ultimate tensile strength when compared to many metals in elevated temperature applications. Titanium's inherent corrosion resistance is high enough that preventative measures such as paint are unnecessary so long as the titanium is not in contact with aluminum or low alloy steel. Contact between titanium and these metals would drive galvanic corrosion in the contact metal. Titanium has a high degree of compatibility with polymer matrix composites (it will not result in galvanic corrosion when in contact with carbon fibers in composite materials), and this is increasingly important as more aerospace platforms utilize composite structures. Aluminum and steel, by contrast, would result in galvanic corrosion with these composites.

Titanium has two different crystalline structures: hexagonal close packed (hcp, or the α phase) and body center cubic (bcc, or the β phase). Titanium will transition from its α phase to the β phase when treated to temperatures above 882° Celsius]. As such, titanium alloys can be divided into three subgroups based on whether they have α phase, β phase, or an α+β phase. Trace elements can be added to titanium to change which phases predominantly occur; those elements that increase the α phase are known as α stabilizers while the elements that increase the β phase are known as β stabilizers. Common α stabilizers include aluminum, oxygen, carbon, and nitrogen. Of these α stabilizers, only aluminum is generally considered desirable while the rest are generally considered contaminants. This is because small amounts of weight percentages of aluminum can greatly increase the alloy's tensile strength and corrosion resistance, but oxygen, nitrogen and carbon result in microscopic hardening within the alloy. This hardening effect will decrease the ductility of the metal, thereby making it more susceptible to cracking. Additionally, α alloys lack ductile to brittle fracture behavior (which occurs in β alloys) making them the choice material for use in a cryogenic environment. Vanadium, molybdenum, iron, chromium and manganese are the predominantly used β stabilizers for titanium. β phase titanium, due to its bcc crystalline structure, tends to have better ductility and toughness when compared to a alloys, resulting in greatly improved fabricability.

For most manufacturing applications, a combination of the superior corrosion resistance and tensile strength offered by the α phase and the improved fabricability of the β phase is desired. For this reason, the most commonly used titanium alloys are α+β phase alloys. α+β phase alloys can be subjected to specific heat treatments in order to produce the specific phase ratio desired in order to have optimum performance in the intended final application. Ti-6Al-4V, in particular, is the most commonly used of all titanium alloys and "accounts for half of all titanium alloy manufactured".

As observed above, titanium has excellent, customizable material properties depending on its microstructure and can be processed or alloyed in such a manner as to work well in a wide variety of situations. Thus, the biggest limiting factor for titanium tends to be cost rather than lacking the requisite material properties. Titanium machining is significantly more expensive than machining of relatively softer metals (e.g., titanium machining is often ten times as expensive when compared to the cost of machining aluminum), and the actual titanium raw material itself can cost up to three times as much as steel or aluminum. For this reason, the use of titanium is generally restricted to high tech applications.

Titanium is primarily used by the aerospace industry. Titanium alloys are often used to make components in aircraft gas turbine engines (GTE) since titanium offers a high strength-to-weight ratio at high operating temperatures. Turbine inlet temperatures can reach temperatures in excess of 1500° C., and even with advanced thermal barrier coatings and cooling designs the effective temperatures that turbine components are exposed to remain high. Additionally, titanium is used in the airframe itself, and makes up about 7% of the total weight in commercial planes and 20-25% of the weight in military aircraft.

The use of titanium is not limited to the aerospace industry, however. Titanium is often the material of choice for steam condensers and heat exchangers (both applications where corrosion resistance and strength at high temperatures are essential). Titanium is used in marine engineering and chemical plants for these same reasons. Titanium is also extensively used in the health care industry. Titanium's β phase alloys have a low modulus of elasticity that is similar to that of bone, making β phase alloys excellent for implants in both orthodontics and general medicine.

Metal matrix composites (MMCs) have been a research topic of high interest for decades, as these materials theoretically offer much greater mechanical properties in elevated thermal conditions than traditional alloys. In the past twenty years, these advanced materials have gone from laboratory use to mass production, as industries ranging from the aerospace industry to automobile industry have adopted metal matrix composites for widespread use.

MMCs are specially fabricated materials that include a base metal with a reinforcing constituent added to the metallic matrix. These constituents are usually added to the matrix in one of three ways: either as continuous fibers, short fibers, or particles. These constituents impede the dislocation motion of the metal matrix, resulting in dispersion and/or precipitation hardening in the metal sample. Typically, low volume fractions are used to maintain the ductility of the final product, but in applications requiring high temperature strength and creep resistance, constituents may reach as high as 15% by volume. Specifically, oxide particulates are often used in higher concentrations as these particulates have high thermal stability. Most types of constituents added are ceramics, but refractory metals may also be used in certain applications. MMCs are produced by a variety of methods, including casting, powder metallurgy, and foil-and-fiber pressing techniques.

In general, MMC are often extremely attractive for use in elevated temperature applications where weight is important design consideration. They offer improved stiffness and strength while reducing weight when compared to traditional metal materials. Adding reinforcing phase to metals such as aluminum, titanium, and nickel can greatly increase the specific strength of these materials, particularly when in use at elevated temperatures.

Another extremely important benefit is that MMCs have such a wide variety of capabilities depending on what material is used as a constituent, what type of method is used to create the material, and which form the composite takes within the metal matrix that MMCs can be designed to have exactly the necessary properties for their intended application. For example, a specific part made of an MMC material can have a specific strength and stiffness in one direction as needed for its application and can have a different coefficient of thermal expansion in a separate direction, in order to best meet the demands of its intended end use. Monolithic materials are generally isotropic, and even when they are anisotropic they still lack the level of customization that is associated with MMC. A final benefit to MMCs is that when the MMCs are created in such a way as to have aligned fibers, the strength and stiffness in the direction of the fibers is often great enough that MMCs may be used directly in components such as stiffeners and struts without requiring any transverse reinforcement due to their much greater strength in the direction the fibers are oriented.

High energy ball milling, or HEBM, is a mechanical process where an initial base powder (usually a metallic powder, either that of a pure element or an alloy) is mixed with smaller quantities of ceramics, nanocomposites, or even other metals. This powder mixture is placed in a ball mill, and the movement of the mill will result in the powder experiencing high energy collisions with the balls. HEBM is also known as mechanical alloying, as it can be used to create alloys from two different metal powders. Additionally, HEBM is one of the many methods used to create MMCs.

HEBM can be used to have different effects depending on what is desired. HEBM may be a mechanical process, but it can result in profound chemical changes in the base powder due to the thermal shock, high-speed plastic deformation, mechanical grinding and fracturing, cold welding, and intimate mixing that occur during HEBM. In addition to making alloys, HEBM may be used to reduce the grain size of powder, potentially to either the nano or sub-micron scale. HEBM is often used to construct metal matrix composites since its ability to mechanically reduce the grain size of powders allows for small particles of ceramics, etc., to be added to metals. If alloying is not desired, HEBM can be employed for short durations to ensure a constituent is well-mixed into a base powder.

MMCs have reached a stage where they are currently in widespread usage across many industries. MMCs first went into mass production as reinforced pistons and engine blocks in the early 1990s. Today, the costs associated with MMCs have decreased enough for them to be utilized across a wide variety of industries. Specialty items such as solar panels, spacecraft or satellite exteriors, nuclear radiation control rods, and catalysts in chemical reactions are now being fabricated from MMCs. Furthermore, MMCs have become the standard material of choice for pistons, cylinders and brakes the automotive industry, and are in widespread use throughout the aerospace industry. Current military aircraft have structures comprised of almost ⅓ MMCs, and commercial aircraft also employ MMCs to a large extent.

This disclosure, and the exemplary embodiments described herein, provide enhanced mechanical properties of Ti-6Al-4V cubes made via AM by adding oxides to the metal matrix.

INCORPORATION BY REFERENCE

The following publications are incorporated by reference in their entirety.

[Reference 1] S. Suresh, Fundamentals of metal-matrix composites, Elsevier, New York, 2013.

[Reference 2] P. Gudlur, A. Boczek, M. Radovic, A. Muliana, On characterizing the mechanical properties of aluminum-alumina composites, Materials Science & Engineering A, 2014, 590, p 352-359.

[Reference 3] A. Maho, S. Detriche, J. Delhalle and Z. Mekhalif, Sol-gel synthesis of tantalum oxide and phosphonic acid-modified carbon nanotubes composite coatings on titanium surfaces, Materials Science and Engineering C, 2013, 33, p 2686-2697.

[Reference 4] M. Hoseini and M. Meratian, Tensile properties of in-situ aluminium-alumina composites, Materials Letters, 2005, 59, p 3414-3418.

[Reference 5] A. Maho, S. Linden and S. Detriche, Tantalum oxide/carbon nanotubes composite coatings on titanium, and their functionalization with organophosphonic molecular films: A high quality scaffold for hydroxyapatite growth, Journal of Colloid and Interface Science, 2012, 371, p 150-158.

[Reference 6] S. B. Boppana, S. Dayanand, M. R. A. Kumar, V. Kumar, and T. Aravinda, Synthesis and characterization of nano graphene and ZrO2 reinforced Al 6061 metal matrix composites, Journal of Materials Research and Technology, 2020, 9, p 7354-7362.

[Reference 7] N. K. Bhoi, H. Singh, and S. Pratap, Developments in the aluminum metal matrix composites reinforced by micro/nano particles—a review, Journal of Composite Materials, 2020, 54, p 813-833.

[Reference 8] T. Jayakumar, and K. Annamalai, Investigation of Hot Tensile Behavior of Silicon Carbide and Magnesium Oxide Reinforced Aluminum Matrix Composites, Silicon, 2019, 11, p 935-945.

[Reference 9] M. Madhusudhan, G. J. Naveen, and K. Mahesha, Mechanical Characterization of AA7068-ZrO2 reinforced Metal Matrix Composites, Materials Today: Proceedings, 2017, 5, p 3122-3130.

[Reference 10] Y. Hu, Laser deposition-additive manufacturing of in situ TiB reinforced titanium matrix composites: TiB growth and part performance, The International Journal of Advanced Manufacturing Technology, 2017, 93, p 3409-3418.

[Reference 11] Y. Hu, W. Cong, X. Wang and Y. Li, Laser deposition-additive manufacturing of TiB—Ti composites with novel three-dimensional quasi-continuous network microstructure: effects on strengthening and toughening, Composites Part B: Engineering, 2017, 133, p 91-100.

[Reference 12] N. Kang, P. Coddet and Q. Liu, In-situ TiB/near α Ti matrix composites manufactured by selective laser melting, Additive Manufacturing, 2016, 11, p 1-6.

[Reference 13] E. Sheydaeian and E. Toyserkani, A new approach for fabrication of titanium-titanium boride periodic composite via additive manufacturing and pressureless sintering, Composites Part B: Engineering, 2018, 138, p 140-148.

[Reference 14] A. Levy, A. Miriyev and A. Elliott, Additive manufacturing of complex-shaped graded TiC/steel composites, Materials & Design, 2017, 118, p 198-203.

[Reference 15] J. Mogonye and A. Srivastava, Solid/self-lubrication mechanisms of an additively manufactured Ni—Ti—C metal matrix composite, Tribology Letters, 2016, 64, p 37.

[Reference 16] H. Attar and K. Damon, Recent developments and opportunities in additive manufacturing of titanium-based matrix composites: a review, International Journal of Machine Tools and Manufacture, 2018, 133, p 85-102.

[Reference 17] R. M. Mahamood and E. T. Akinlabi, Heat affected zone Relationship with processing parameter in Additive Manufacturing Process, Materials Today: Proceedings, 2018, 5, p 18362-18367.

[Reference 18] C. Qiu, C. Panwisawas, M. Ward, H. C. Basoalto, J. W. Brooks and M. M. Attallah, On the role of melt flow into the surface structure and porosity development during selective laser melting, Acta Materialia, 2015, 96, p 72-79.

[Reference 19] T. Y. Ansell, T. Hanneman, A. Gonzalez-Perez, C. Park, and A. Nieto, Effect of high energy ball milling on spherical metallic powder particulates for additive manufacturing, Particulate Science and Technology, 2021, DOI: 10.1080/02726351.2021.1876192.

[Reference 20] M. Fukuhara and A. Sanpei, Elastic moduli and internal frictions of Inconel 718 and Ti-6Al-4V as a function of temperature, Journal of Materials Science Letters, 1993, 12, p 1122-1124.

[Reference 21] W. C. Oliver, G. M. Pharr, An improved technique for determining hardness and elastic modulus using load and displacement sensing indentation experiments, Journal of Materials Research, 1992, 7, p 1564-1583.

[Reference 22] E. Fereiduni, A. Ghasemi, and M. Elbestawi, Selective Laser Melting of Aluminum and Titanium Matrix Composites: Recent Progress and Potential Applications in the Aerospace Industry, Aerospace, 2020, 7, p 77.

[Reference 23] I. Yadroitsev and I. Smurov, Selective laser melting technology: From the single laser melted track stability to 3D parts of complex shape, Physics Procedia, 2010, 5, p 551-560.

[Reference 24] U. S. Bertoli, A. J. Wolfer, M. J. Matthews, J.-P. R. Delplanque and J. M. Schoenung, On the limitations of Volumetric Energy Density as a design parameter for Selective Laser Melting, Materials & Design, 2017, 113, p 331-340.

[Reference 25] U. S. Bertoli, G. Guss, S. Wu, M. J. Matthews and J. M. Schoenung, In-situ characterization of laser-powder interaction and cooling rates through high-speed imaging of powder bed fusion additive manufacturing, Materials & Design, 2017, 135, p 385-396.

[Reference 26] G. Economos and W. D. Kingery, Metal-Ceramic Interactions: II, Metal-Oxide Interfacial Reactions at Elevated Temperatures, Journal of the American Ceramic Society, 1953, 36, p 403-409.

[Reference 27] R. E. Tressler and T. L. Moore, Mechanical Property and Interface Reaction Studies of Titanium-Alumina Composites, Metals Engineering Quarterly, 1971, 11, p 16-22.

[Reference 28] D. E. Boss and J. M. Yang, Interface Modification for Fiber-Reinforced Titanium Aluminide Composites, Materials Research Society Symposium Proceedings, 1990, 194, p 429-436.

[Reference 29] S. Ranganath, A review on particulate-reinforced titanium matrix composites, Journal of Materials Science, 1997, 32, p 1-16.

[Reference 30] Y. Jiao, L. Huang and L. Geng, Progress on discontinuously reinforced titanium matrix composites, Journal of Alloys and Compounds, 2018, 767, p 1196-1215.

[Reference 31] L. Huang, Q. An, L. Geng, S. Wang, S. Jiang, X. Cui, R. Zhang, F. Sun, Y. Jiao, X. Chen and C. Wang, Multiscale Architecture and Superior High-Temperature Performance of Discontinuously Reinforced Titanium Matrix Composites, Advanced Materials, 2021, 33, 2000688.

[Reference 32] C. Han, Y. Li, X. Xu, S. Ren, X. San, and X. Zhu, Ti/SiO2 composite fabricated by powder metallurgy for orthopedic implant, Materials and Design, 2013, 49, p 76-80.

[Reference 33] Y. Li, K. S. Munir, J. Lin, and C. Wen, Titanium-niobium pentoxide composites for biomedical applications, Bioactive Materials, 2016, 1, p 127-131.

[Reference 34] K. Trofimov, R. Y. Lutfullin, R. M. Kashaev, Elastic properties of the titanium alloy Ti-6Al-4V, Letter on Materials, 2015, 5, p 67-69.

BRIEF DESCRIPTION

In accordance with one embodiment of the present disclosure, disclosed is a method of 3D printing oxide reinforced titanium composites comprising: generating a composite powder by combining a titanium material and an oxide in a high energy ball mill, wherein the high energy ball mill is used to perform multiple milling cycles, wherein each of the multiple milling cycles is approximately one to five minutes of milling followed by approximately one to ten minutes of inactivity for cool-down; configuring a custom support structure for supporting a metal component, wherein the custom support structure comprises large cylindrical support structures along an edge of a target print area of the metal component, wherein each of the large cylindrical support structures are larger than a default cylindrical support structure of a 3D printing software; and printing, using a selective laser melting machine, the metal component and the custom support structure with the compositive powder.

In accordance with another embodiment of the present disclosure, disclosed is A 3D printed oxide reinforced titanium composite comprising: an oxide; and a titanium material, particles of the oxide being embedded in the titanium material such that minimal to no porosity is exhibited at an interface of the titanium material and the oxide; and a support portion of the titanium composite arranged in a custom support structure for supporting a metal component comprising a component portion of the titanium composite, the custom support structure comprising large cylindrical support structures along an edge of a target print area, wherein each of the large cylindrical support structures have a minimal thickness to prevent damage caused by thermal stresses of 3D printing.

In accordance with another embodiment of the present disclosure, disclosed is A method of 3D printing oxide reinforced titanium composites comprising: generating a composite powder by combining a titanium material and an oxide in a high energy ball mill, wherein the high energy ball mill is used to perform multiple milling cycles, wherein each of the multiple milling cycles is at least one minute of milling followed by at least one minute of inactivity for cool-down; configuring a custom support structure for supporting a metal component, wherein the custom support structure comprises large cylindrical support structures along an edge of a target print area of the metal component; and printing, using a selective laser melting machine, the metal component and the custom support structure with the compositive powder.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

For a more complete understanding of the present disclosure, reference is now made to the following descriptions taken in conjunction with the accompanying drawings, in which.

DETAILED DESCRIPTION

Figure 1:
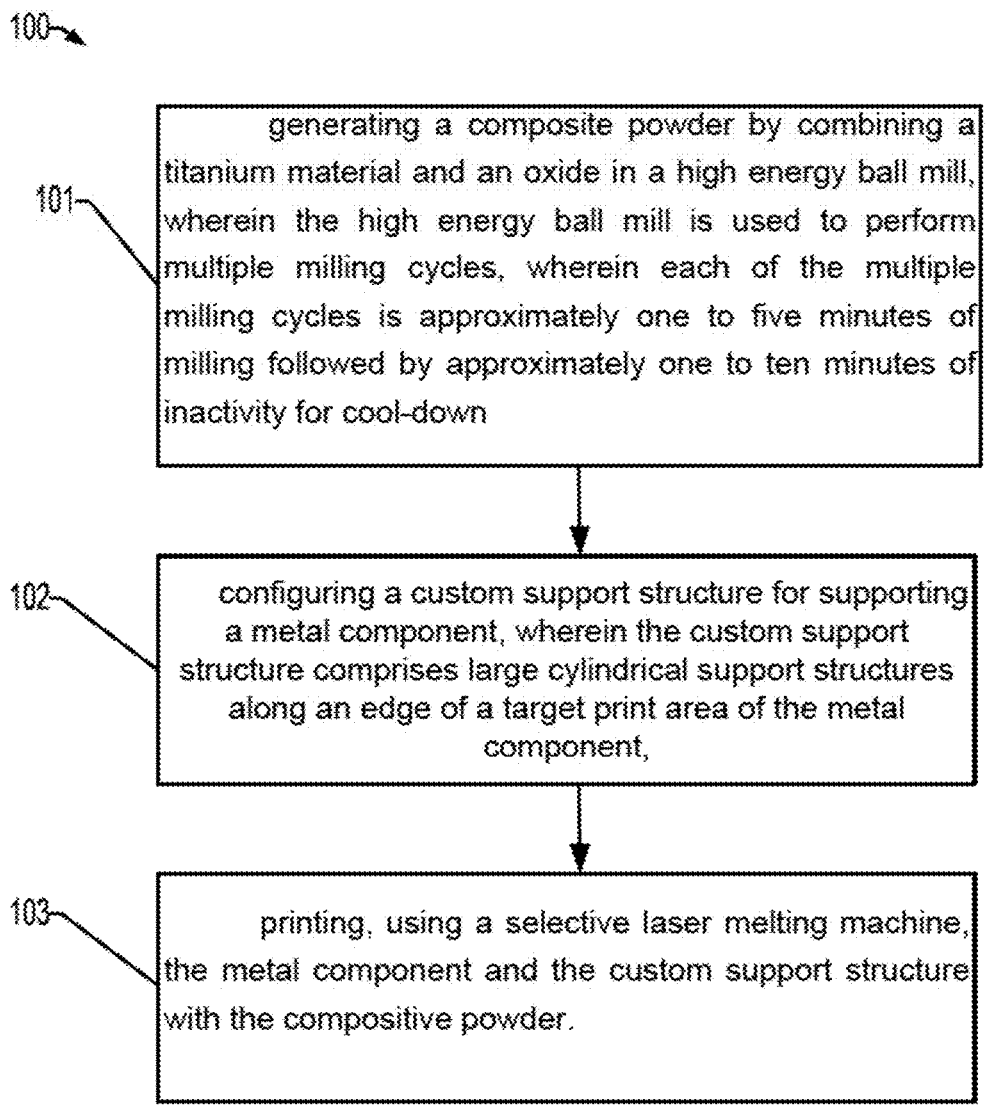
FIG. 1 is a flow chart of a method of 3D printing oxide reinforced titanium composites according to an exemplary embodiment of this disclosure.

Selective laser melting (SLM) processing of metal matrix composites (MMCs) provides unique challenges due to the presence of dissimilar interfaces subjected to rapid melting and solidification. According to one aspect of this disclosure, Ti64 composite powder with either nanometric aluminum oxide (Al2O3) or tantalum pentoxide (Ta2O5) is mixed using high energy ball milling operated under mild conditions, and subsequently fabricated by SLM. Up to 3 vol. % of oxides is uniformly deposited on the surface of the Ti64 feedstock powder. Despite uniform dispersion, the presence of oxides led to powder flowability and melt pool instability issues during the SLM process. Scanning electron microscopy and energy dispersive X-ray spectroscopy are used to characterize changes in microstructure and to confirm presence of oxides in the SLM-fabricated composites. A 1 vol. % Ta2O5 reinforced Ti MMC yields improved mechanical properties at multiple scale lengths (micro and nano). Macroscale processing induced defects (e.g., pores, un-melted particles, cracking) were present in the other composites fabricated. However, localized nanoscale properties were also enhanced in a 3 vol. % Ta2O5 reinforced Ti composite, and a 1 vol. % nano-Al2O3 reinforced composite.

Titanium alloys are currently utilized in gas turbine engines (GTE) for their high strength to weight ratio and high corrosion resistance. Further enhancing the strength-to-weight ratio of Titanium alloys and composites can yield fuel savings and or increase payload weight margins. Titanium alloys are generally used in 'colder' sections of the GTE, while nickel based superalloys are used in hotter sections. There is an urgent need to develop new high temperature materials that can operate at the higher temperatures demanded by higher performance engines. One of the advantages of nickel superalloys over titanium is the high creep strength and resistance of nickel superalloys. The applicability of titanium for high temperature materials requires enhanced creep resistance. Furthermore, the future of manufacturing appears to be in the realm of 3D printing. 3D printing can lead to vast savings from enabling production at the site of need and reducing the dependence on machining to produce final parts and components. 3-D printing of metallic materials is emerging and there are no techniques available in the patent literature for how to produce Titanium based composites using available metal 3D printing techniques.

Embodiments of this disclosure address three challenges or problems related to titanium materials and their applications: 1) a need to enhance strength to weight ratio, 2) a need to increase the temperature envelope and performance of Ti materials, and 3) a need for manufacturing methods and techniques to fabricate 3D printed titanium composites.

The state of the art titanium alloy used in many aerospace applications is the Ti-6Al-4V (Ti64) alloy. Titanium has two primary crystal structures—or phases, alpha and beta. The Ti64 alloy consists of an alpha plus beta microstructure. The addition of aluminum (Al) and vanadium (V) are engineered to stabilize the alpha and beta phase, respectively, in order to enhanced phase stability at elevated temperatures. Furthermore, the incorporation of Al enhanced tensile strength and corrosion resistance. Heat treatments can be used to control the proportions of alpha and beta in Ti64, or other stabilizers can be used to induce a predominantly alpha or beta microstructure. These alloys have been engineering for several decades, and new advancements in titanium alloys have stagnated. Significant titanium research now focuses on reproducing and controlling these microstructures in 3D printing processes such as selective laser melting.

The incorporation of oxide particulates enhances the hardness and elastic modulus of the Ti based composite relative to the unreinforced 3D printed alloy. The oxide reinforcement particulates should maintain uniform dispersion during the 3D printing process to attain dispersion strengthening mechanism. Uniform dispersion of oxide is important to inhibiting diffusion of one or more metallic species that catalyze oxidation reaction.

While example herein describe Ti64 as the titanium material used, those skilled in the art will appreciate that various other Titanium materials can be used.

The description below provides exemplary embodiments of the present disclosure. The scope of the present disclosure, and exemplary embodiments described herein, is not limited by these exemplary embodiments. Numerous variations, whether explicitly provided for by the specification or implied by the specification or not, may be implemented by one of skill in the art in view of this disclosure.

Selective laser melting (SLM) is an additive manufacturing (AM) technique in which layers of metal powder are deposited and subsequently melted by a laser in order to build a part layer-by-layer. SLM has numerous advantages over traditional manufacturing including greater versatility in design, customization, reduction of waste products, and short transition periods between material development and commercialization. These advantages have created a desire to produce parts by SLM from advanced materials such as titanium matrix composites. Such materials would find applications in gas turbine engines (GTE), biomedical implants, and marine applications. [Ref. 1]

Metal matrix composites (MMCs) have been investigated for decades and are now utilized in myriad applications due to their superior performance over pure metals and alloys. For example, Ti-MMCs exhibit greater mechanical properties in elevated temperature conditions as compared to Ti alloys. In addition to improved functionality, Ti-MMCs typically offer significant weight reductions due to the use of ceramic particulates or fibers as the secondary reinforcement phase. Oxide fiber reinforced MMCs have been shown to yield lower density, higher specific strength, higher specific modulus, higher thermal conductivity, good fatigue resistance, and higher abrasion and wear resistance. [Refs. 1-9] Using oxides such as alumina ($Al_2O_3$) [Ref. 2] and tantalum pentoxide ($Ta_2O_5$) [Ref. 3] in MMCs has the potential to increase high temperature corrosion resistance while maintaining or improving mechanical properties of interest. For example, the tensile strength of aluminum-silicon-copper alloy reinforced with 4 wt. % alumina (88 MPa) when subjected to a tensile test at an elevated temperature of 300° C. is higher than that of the base alloy (62 MPa). [Ref. 4] When $Ta_2O_5$ thin films are grown on titanium, it has been shown that the oxide film significantly increases the free potential of titanium and reduces corrosion. [Ref. 5] For this reason, $Ta_2O_5$ coatings on titanium alloys are used in biomedical applications. [Ref. 3]

Recently, a few studies have investigated the mechanical properties of titanium based MMCs produced by AM techniques. Most of these studies have incorporated borides (TiB [Refs. 10 and 11]), TiB—Ti ([Refs. 12 and 13]) or carbides (TiC [Ref. 14], Ni—TiC—C [Ref. 15]). These studies have revealed some of the challenges to fabricating MMCs using SLM and other AM processes. MMCs fabricated via AM tend to have a greater propensity for pore formation due to instabilities within the melt pool. The incorporation of ceramic particulates can change the melt pool characteristics and solidification thereof. In addition, the higher melting point of the ceramic phase can lead to a melt pool that is not fully molten. [Ref 16] Numerous cycles of melting and solidifying can lead to the formation of a heat-affected zone similar to that formed during welding and can result in residual stresses and cracking due to a mismatch in thermal expansion. [Ref 17] These effects can be further exacerbated if the secondary ceramic phases are not uniformly dispersed, as solidification and heat transfer rates will vary in particulate-rich and particulate-deficient regions. Inhomogeneous cooling within the melt pool has been shown to enhance the Marangoni force and convective flow within the melt pool, which can translate into melt pool splashing that leads to defects and porosity. [Ref. 18] Hence, it is critically important to characterize the processing-microstructure-property relations in SLM processed MMCs in order to reliably produce advanced composites by AM. In particular a stronger understanding of how ceramic particulates may affect powder flowability and subsequent microstructural evolution and mechanical behavior is missing from the literature and hence there is a need to further investigate this area.

This disclosure, and the exemplary embodiments provided herein, include AM processed Ti-MMCs reinforced with either aluminum oxide or tantalum pentoxide. Composite feedstock powders of Ti-6Al-4V (Ti64) with 1% and 3% (by volume) reinforcements of either nano-$Al_2O_3$ or $Ta_2O_5$ were prepared by high energy ball milling and then 3-D printed using SLM. The effects of the oxide reinforcements on microstructural evolution and mechanical properties were investigated. SLM produced bulk Ti64 composites reinforced with 1% volume micro $Ta_2O_5$ particulates that yielded enhanced mechanical properties. Other composites exhibited enhanced localized mechanical properties but encountered challenges in bulk fabrication due to poor powder flowability and possible melt pool instability induced by the nanometric oxide particulates.

With reference to FIG. 1, shown is a flow chart of a method of 3D printing oxide reinforced titanium composites 100 according to an exemplary embodiment of this disclosure.

Initially, at step 101, the method generates a composite powder by combining a titanium material and an oxide in a high energy ball mill, wherein the high energy ball mill is used to perform multiple milling cycles, wherein each of the multiple milling cycles is approximately one to five minutes of milling followed by approximately one to ten minutes of inactivity for cool-down.

It is to be understood that this disclosure, and the exemplary embodiments described, are not limited to multiple milling cycles of approximately one to five minutes of milling followed by approximately one to ten minutes of inactivity for cool-down. Other processing parameters include multiple milling cycles, wherein each milling cycle is at least one minute of milling followed by at least one minute of inactivity for cool-down. According to one exemplary embodiment, the process includes multiple milling cycles, wherein each milling cycle is approximately two minutes of milling followed by approximately five minute of inactivity for cool-down.

Next, at step 102, the method configures a custom support structure for supporting a metal component, wherein the custom support structure comprises large cylindrical support structures along an edge of a target print area of the metal component.

Next, at step 102, the method 3D prints, using a selective laser melting machine, the metal component and the custom support structure with the compositive powder.

Now provided below, are further details of the disclosed 3D Printed Oxide Reinforced Titanium Composites and Methods.

Materials and Methods

Materials & Composite Fabrication

SLM grade spherical Ti64 powder (FIGS. 2a-2b) with a 99.6% overall purity (containing following impurities:

O<2000 ppm, N<500 ppm, C<800 ppm, H<120 ppm, and Fe<2500 ppm) was procured from EOS of North America. The particle size ranged from 20-80 µm. Reinforcement oxide particulates consisted of a $Ta_2O_5$ powder procured from NOAH Technologies Corporation with 99.9% purity and an average particulate size of just under 10 µm (FIG. 2c-2d) and a gamma phase nanometric (~80 nm) $Al_2O_3$ powder (FIGS. 2e-2f) of 99.0% purity procured from the MTI Corporation. The use of nanometric $Al_2O_3$ powder was utilized to increase the amount of relative surface area, which was intended to enhance adhesion to the larger spherical Ti64 particles that would essentially serve as a carrier for the ceramic particulates. Finer $Ta_2O_5$ particulates were not attainable commercially at the time of fabrication.

Composite powders were synthesized by mixing the Ti64 metal matrix powder and oxide reinforcement powder in a high energy ball mill (HEBM, SPEX Sample Prep 8000M Mixer/Mill machine) under mild operating conditions. The HEBM process consisted of ten cycles, where each cycle consisted of two minutes on followed by five minutes off (a cool-down period to help prevent melting from occurring). Stainless steel milling balls were used as the milling media with a ball-to-powder (BPR) ratio of 1:10. These parameters were shown in our previous work to retain the spherical morphology of metallic powders for additive manufacturing applications [Ref 19]. The HEBM process was used to insure good distribution of the ceramic reinforcements throughout the metallic powder and adequate adhesion to the Ti64 particulate surface. Four composite powders were created: Ti64 with 1% nano-$Al_2O_3$ (Ti—Al1), Ti64 with 3% nano-$Al_2O_3$ (Ti—Al3), Ti64 with 1% $Ta_2O_5$ (Ti—Ta1), Ti64 with 3% $Ta_2O_5$ (Ti—Ta3).

Selective Laser Melting Processing

Figure 2C:
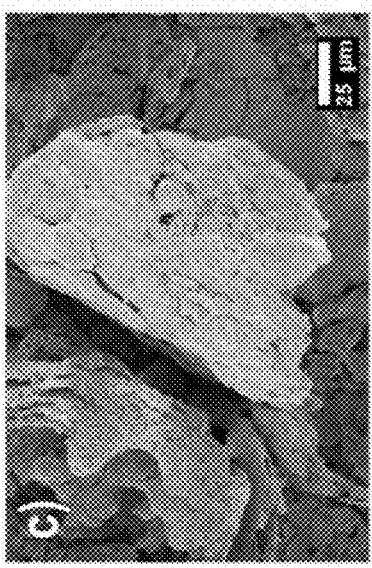
FIGS. 2A-2F show Scanning electron micrographs (SEM) and transmission electron micrograph (TEM) of as-received powders, (2A) SEM image of Ti64 powder at low magnification, (2B) SEM image of Ti64 powder at high magnification showing smooth surface of titanium powder, (2C) SEM image of Ta2O5 powder at low magnification, (2D) SEM image of Ta2O5 powder at high magnification, (2E) SEM image of Al2O3 powder at low magnification, (2F) TEM image of Al2O3 powder at high magnification.
Figure 2F:
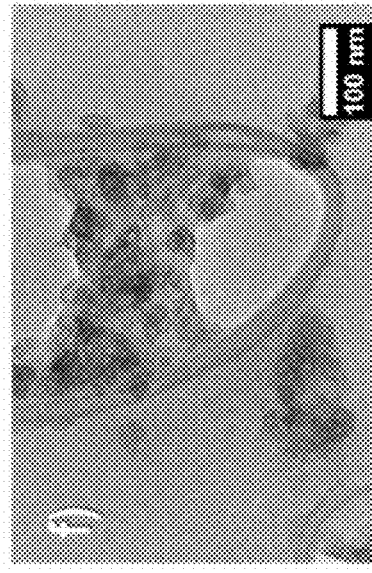
Figure 2B:
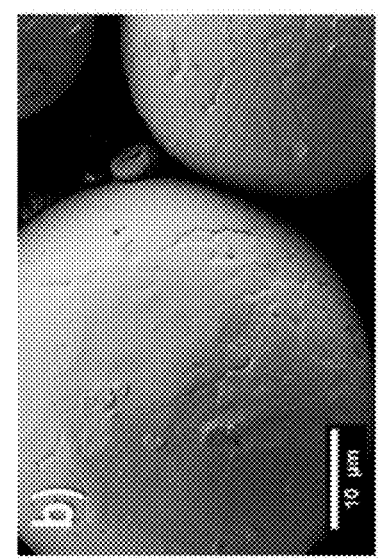
Figure 2E:
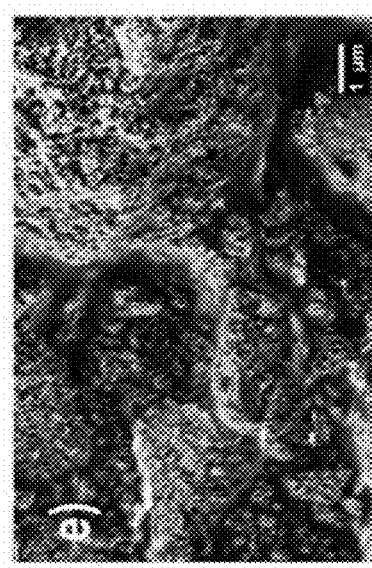
Figure 2A:
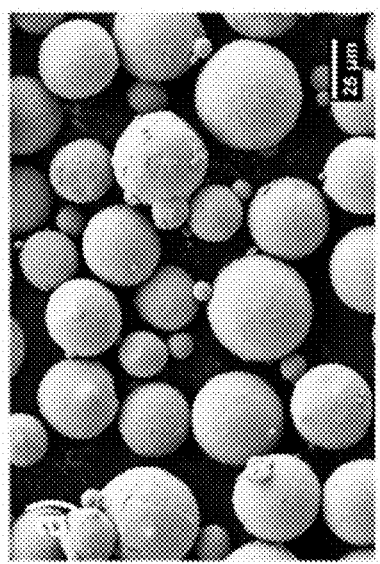
Figure 2D:
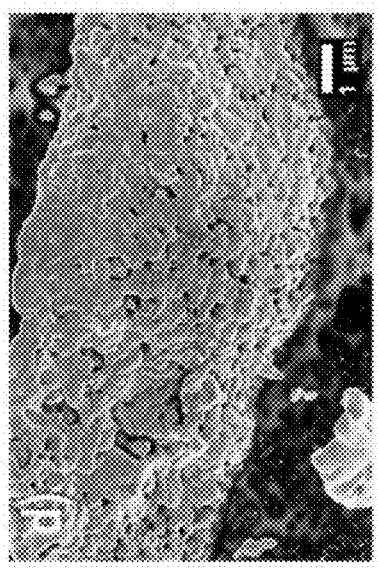
Figure 3A:
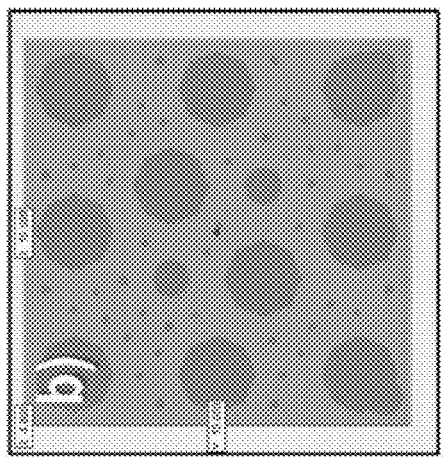
FIGS. 3A-3D show 3D print input files and completed build, (3A) MATERIALISE MAGICS 3D slice file, (3B) MATERIALISE MAGICS 2D view of supports, (3C) EOS batch file, (3D) final SLM-printed part.
Figure 3B:
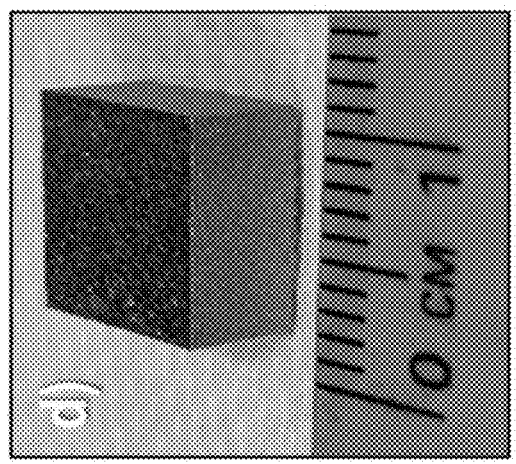
Figure 3C:
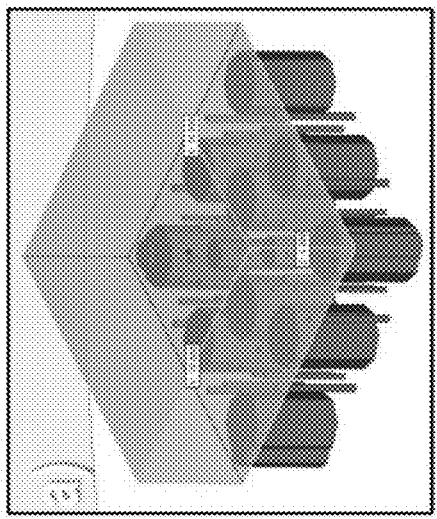
Figure 3D:
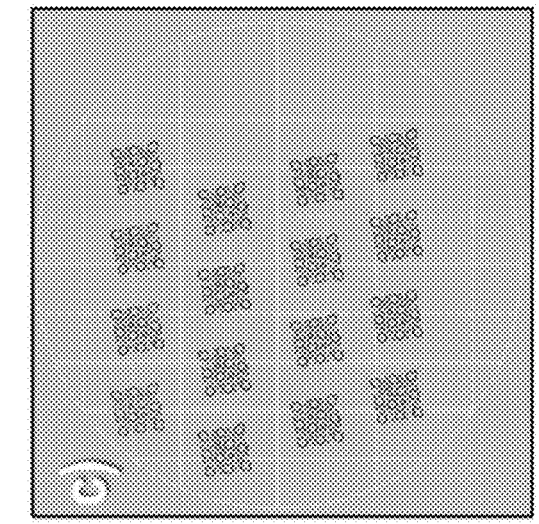

Cuboid specimens were additively manufactured by SLM using an EOS M 100 printer. This SLM machine utilizes a Yb-fiber laser and was operating in an Ar atmosphere using the manufacturers recommended parameters for Ti64. For the bulk build region, the laser power was 100 watts, the rastering speed was 1400 mm/s, and the beam offset was 0.097 mm. Cuboids of 4 mm×4 mm×10 mm were designed in SolidWorks then imported to the MATERIALISE MAGICS software for slicing layers. Originally, default support cross hatching was used; however, difficulty getting the composite powder to adhere to the supports once building of the actual cubes commenced led to the use of much thicker, custom made cylindrical supports (FIG. 3.) Large cylindrical support structures were added around the edges of the cube, in addition to an automated matrix of cylindrical supports in between gaps that was generated by the MATERIALISE MAGICS software (FIGS. 3a-3b). The sliced file was then import into the EOSM100 software and a 4×4 matrix of cubes was laid out as shown in FIG. 2c. A printed typical final cuboid part is shown in FIG. 3d.

Regarding the cylindrical supports shown in FIG. 3, according to an exemplary embodiment, the cylinders were modeled with three different diameters: large (2.0 mm), medium (1.0 mm), and small (0.2 mm), and all the cylinders were 2.3 mm tall. However, it is to be understood that other cylindrical support diameters can be used and are within the scope of this disclosure.

The software used to model the support cylinders (MATERIALISE MAGICS) allows some control over the number of supports. This will control the area of the part that is directly supported by a cylinder. Further details include:

The area covered with all supporting cylinders was ~39.4%.

If the smallest columns are all removed, supported area is ~35.1%.

If the medium columns are removed, supported area is ~33.3%.

If all large supporting columns are removed except the four corner columns, supported area drops to ~17.1%.

The range of supported area is then 17.1% to 39.4%.

Characterization

SLM printed specimens were metallographically mounted, ground, and polished using progressively finer SiC paper (down to 600 grit) and 1 µm diamond polishing media, respectively. Specimens were etched with a solution that was 10 vol. % HF, 5 vol. % $HNO_3$, and 85 vol. % $H_2O$ in order to make the α and β phases easily discernible under a microscope. A scanning electron microscope (SEM, ZEISS NEON 40 FIB-SEM, Oberkochen, Germany), was used to take images on etched samples using an accelerating voltage of 20 kV, a working distance of 5 mm, and a 30 µm aperture with both backscatter and secondary electron detectors. Energy dispersive X-ray spectroscopy (EDS) was conducted using an EDAX (Mahwah, N.J., USA) Octane Elect with a windowless Si-drift detector, while utilizing a 20 keV accelerating voltage and an aperture size of 60 µm. A Rigaku (Tokyo, Japan) Miniflex 600 X-ray diffractometer (XRD) with a Cu K-α target, a K-β Ni filter, λ=1.54 Å, step size of 0.01°, and 0.2 s exposure time was used to characterize the elements present within the completed builds. An Agilent (Santa Clara, CA, USA) nano-indenter XP was used at two different loading conditions: 500 mN and 3 mN to characterize the mechanical properties of the composites at multiple scale lengths. The 500 mN test evaluated the microscale mechanical properties due to the micrometric depth of the indentations (relatively large volume of material indented), whereas the 3 mN tests evaluated very localized nanoscale mechanical properties. Using a Poissons ratio of 0.34 for titanium alloy [Ref. 20] allowed for the calculation of hardness and elastic modulus for both the composite materials and the control sample via the Oliver-Pharr method. [Ref 21] For the 500 mN tests, an indentation matrix of 25 total indents spaced out in a square 5×5 array with a spacing of 25 µm in between indents was conducted. For the 3 mN tests, an indentation matrix of 100 total indents spaced out in a square 10×10 array with a spacing of 5 µm in between indents was conducted. For each individual indentation test, the time to load was 10 s, followed by a peak load hold time of 3 seconds, and an unload time of 10 s. The surface approach velocity of the indenter tip was set to 100 nm/s and the indents were only loaded and unloaded a single time. A 20 nm radius diamond Berkovich tip was used. Indents were performed on a plane perpendicular to the layer direction, in line with the layers.

Results & Discussion

Composite Powder Synthesis

Figure 4A:
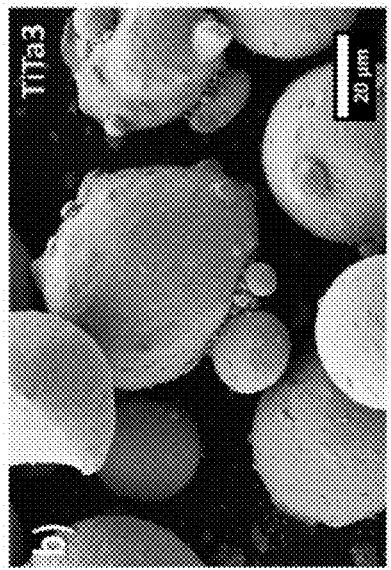
FIGS. 4A-4D show SEM images of composite powders showing reinforcing constituents on Ti64 surface, (4A) Ti—Ta1, inset highlights tantalum oxide particles observed via backscatter detector, (4B) Ti—Ta3, (4C) Ti—Al1, inset highlights alumina particles on the surface of the titanium spheres (4D) Ti—Al3.
Figure 4B:
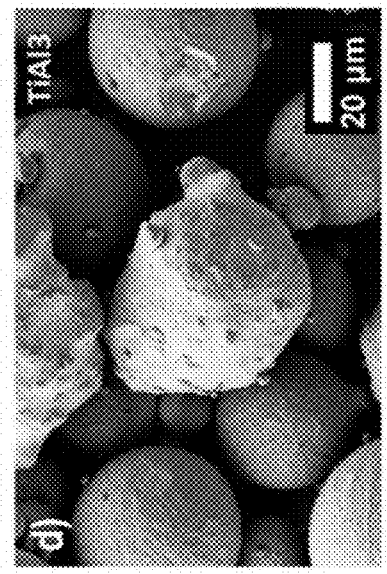

The HEBM process was largely successful in that it resulted in good dispersion of the reinforcing ceramics and broke up most, if not all, of the large agglomerates of the oxide reinforcements. SEM analysis of the Ti—Ta1 powder (FIG. 4a) indicates the vast majority of $Ta_2O_5$ particles were well adhered to the host Ti64 powder spheres and achieved good distribution throughout. Only a few standalone oxide particulates can be seen, and agglomerates of multiple oxide particulates are few and sporadic. Increasing the $Ta_2O_5$ volume fraction to 3% altered the localized and overall morphology of the Ti—Ta3 powder (FIG. 4b). Locally, the shape of the spherical Ti64 particulates has been altered and appear more irregular, with larger oxide particulates jutting out. In addition, the occurrence of multiple oxide-decorated Ti64 particulates joined together appears throughout the powder. The oxide particulates appear to act as anchors that lead to adherence between Ti64 particulates, effectively increasing the overall particulate size. However, aside from an increased presence of larger agglomerates, the oxide particulates appear to be uniformly dispersed and again only a small amount of standalone (non-adhered) particulates are present.

Figure 4C:
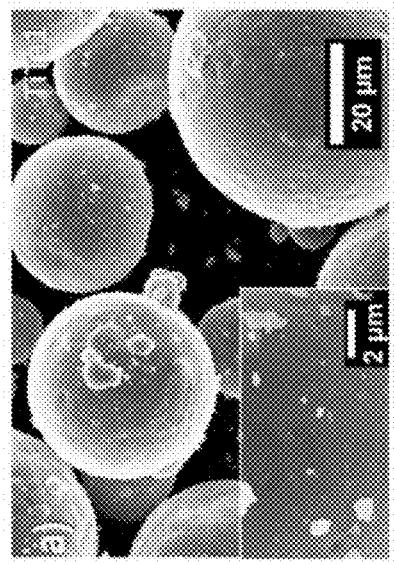
Figure 4D:
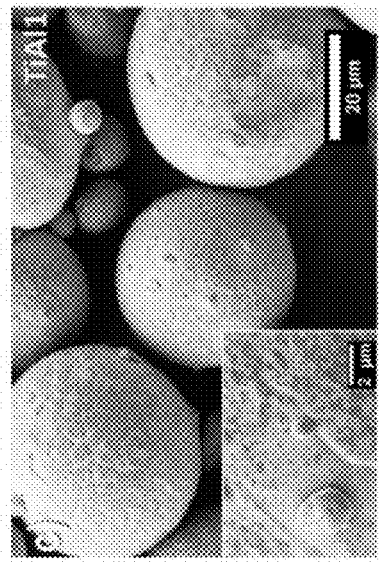

Similar trends are seen with the nano-$Al_2O_3$ reinforced composite powders. The Ti—Al1 (FIG. 4c) powder exhibits excellent dispersion of the nano-$Al_2O_3$ particles throughout the surface of the Ti64 particulates. Hardly any standalone nano-$Al_2O_3$ particles can be found, and the shape of the spherical Ti64 powder remains unaltered. The higher surface-to-volume ratio of the nanometric oxide induces greater van der Waals adhesion forces that results in excellent adherence of the nano oxide to the host Ti64 particulate. The nanometric size results in less disruption of the overall spherical morphology as compared with the large micrometric $Ta_2O_5$ particulates. The Ti—Ta3 powder (FIG. 4d) is qualitatively similar in terms of the good dispersion and adherence of the nano-$Al_2O_3$ particles. A key difference was those regions with large groupings of nano-$Al_2O_3$ particles were much more common in the Ti—Al3 powder than they were in the Ti—Al1 powder. These larger agglomerates jut out from the Ti64 particulate surface and adversely affect the overall spheroidicity of the composite powder.

While overall oxide dispersion was adequate in the composite powders, the resulting composite powders had reduced flowability when compared to the base Ti64 powder. Flowability is a nebulous concept that can be difficult to quantify; this study limited observations of flowability to the relative ease in flowing powders through a 425 μm sieve, and the ease of spreading a uniform layer during SLM processing. When the commercially pure Ti64 powder was poured through a 425 μm sieve, the powder would flow easily without agitation. The composite powders required shaking the 425 μm sieve in order to get all of the powder to flow through the sieve. The Ti64-$Ta_2O_5$ powders had noticeably poorer flowability compared to the Ti64-$Al_2O_3$ powder, as it required noticeably more agitation to get it to pass through the 425 μm sieve comparatively. The large micron sized $Ta_2O_5$ particles on the surface of the Ti64 powders can act as interlocking obstacles that hinder rotation and hence flowability. Fereiduni et al. [Ref. 22] previously observed that micron-sized particulates of $B_4C$ induced localized friction due to mechanical interlocking and subsequent entanglement that adversely affected flowability. In contrast, the nanometric $Al_2O_3$ particles do not affect the overall spherical shape of the Ti64 host particulate. For both sets of powders, increasing the filler content from 1 vol. % to 3 vol. % did not appear to change the rate for which the powder flowed past the 425 μm sieve. This observation is promising for further increasing the oxide content without exacerbating flowability issues, which appear to be dependent on and intrinsic to the oxide particulate size.

SLM Processing Builds

Figure 5A:
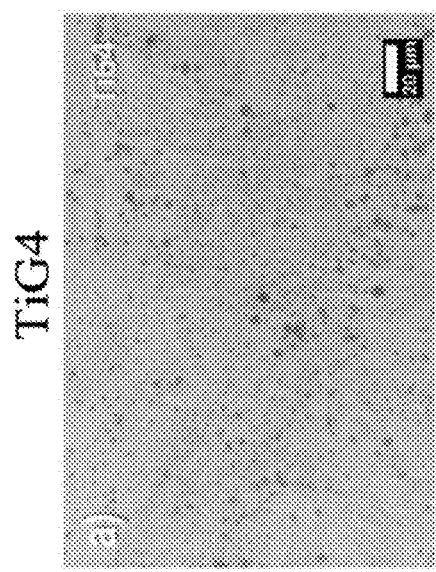
FIGS. 5A-5F show SEM of microstructure of control and composite specimen completed builds, (5A) Ti64 (5B) TiTa1, (5C) TiTa3, inset image highlights macro porosity within build, (5D) TiAl1, (5E) TiAl3, (5F) higher magnification image of TiAl3, inset highlighting localized crack within TiAl3 build.
Figure 5B:
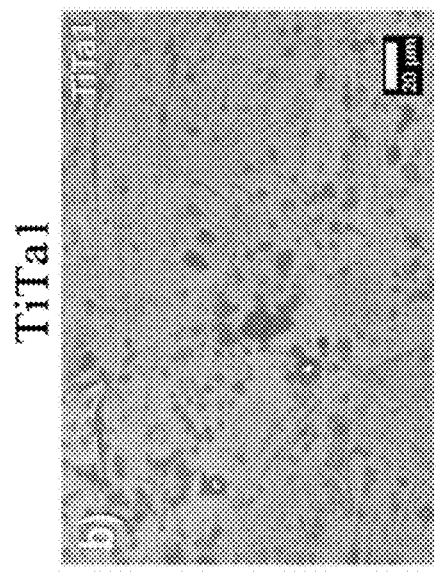
Figure 5C:
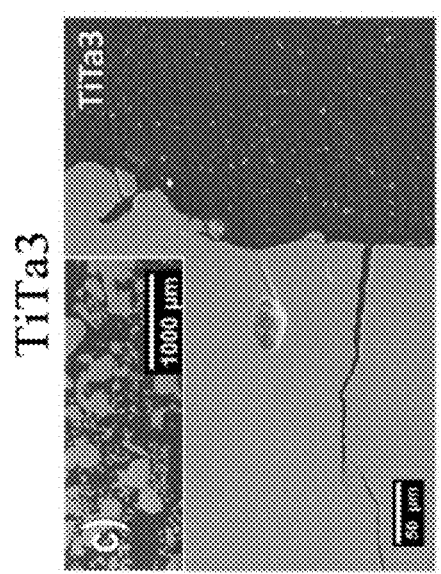

The differences in powder characteristics and composition led to processing variations during the SLM fabrication of the composites. The control sample made solely from the commercial grade Ti64 was fabricated via SLM to serve as a baseline for comparison. The control Ti64 sample had very low porosity and was mostly uniform (FIG. 5a). Of the four composite powders, only the Ti—Ta1 powder resulted in a complete build without any observed issues during the run. As with the control Ti64, Ti—Ta1 was fully dense and had uniform structure (FIG. 5b). The Ti—Ta3 powder resulted in an incomplete build due to poor flowability of the powder, which lead to high macro porosity, as seen in the inset in FIG. 5c. Only a porous skeleton of the desired geometry was attained and even the most continuous/dense regions exhibited large (~100 μm) cracks, as shown in FIG. 5. The poor flowability of the powder results in a discontinuous powder bed with inherent porosity, due to missing powder particulates. Discontinuities in the powder bed are compounded as the build progresses from the support structures to the solid part. As subsequent layers are melted, underlying layers experience high thermal stresses. The support structures are not adequately built due to poor flowability and are not able to withstand higher thermal stresses as the solid part is built, resulting in delamination of the solid material from the supports. Delamination disrupts the planarity of the build, which disrupts the ability to subsequently deposit a planar powder bed.

Figure 5D:
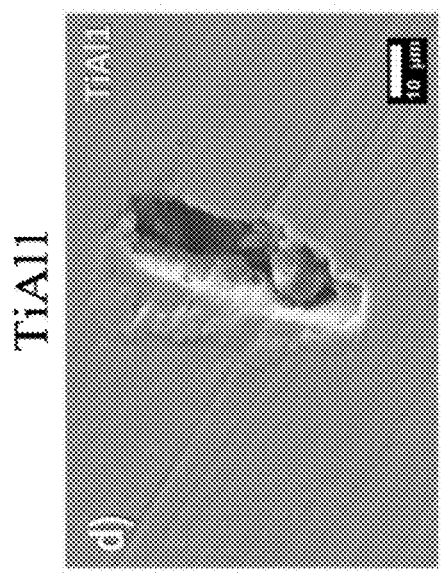
Figure 5E:
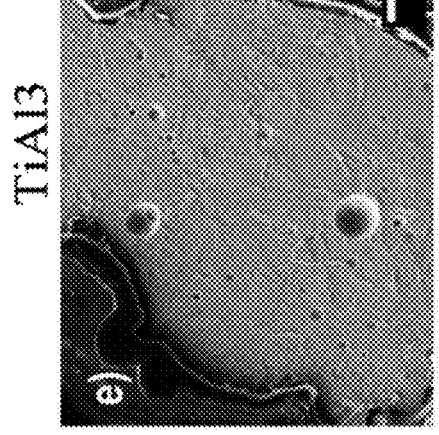
Figure 5F:
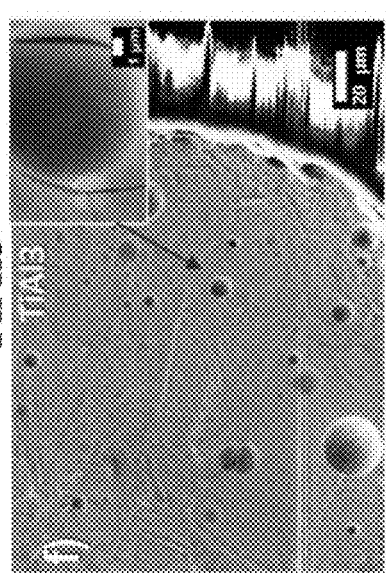

The nano-$Al_2O_3$ containing composite powders failed to completely build due to what appeared to be higher instances of melt pool splashing during the build run. Melt pool splashing manifests as sparking and the appearance of ignition during the deposition process and has been characterized by Qiu et al. [Ref. 18] using high speed and high resolution video imaging. Melt pool splashing would often result in the uniformity of the powder bed being disrupted, in addition to defects induced by the solidified splashed metal. This resulted in micro porosity issues such as that shown in FIG. 5d. The Ti—Al3 powder resulted in an incomplete build due to a combination of melt pool splashing and flowability issues. Melt pool splashing occurred to a greater degree in Ti—Al3 than in Ti—Al1, however, powder appeared not to flow as well even in areas where splashing was absent. The nanometric $Al_2O_3$ is believed to lead to inhomogeneous cooling of the melt pool because of its low thermal conductivity and propensity to agglomerate. This would be expected to increase the Marangoni force and convection flows. The higher surface area of nanoparticles could also provide more interfaces to disrupt melt flow. These proposed mechanisms would be exacerbated with increased content of nano-$Al_2O_3$; however, further studies are needed to confirm the mechanisms that lead to greater melt pool splashing when incorporating nano$Al_2O_3$ than when using micro $Ta_2O_5$ and whether using micro-$Al_2O_3$ instead could minimize melt splashing. For both Ti—Al1 and Ti—Al3, significant macroscale porosity existed, however, a sufficient portion of the solid build (beyond support structures) was completed to allow for microstructural and indentation analysis. Solid parts in Ti—Ta3 consisted of 200-300 μm wide fully melted regions, that exhibited microporosity and micro cracking uniformly distributed them, as shown in FIGS. 5d and 5e. It should be emphasized that incomplete builds provide valuable information for evaluating new compositions, especially given the fact that many of the most widely cited papers on SLM are in fact done on just single track depositions. [Refs. 18 and 23-25]

Microstructure & Phase Characterization

Figure 6A:
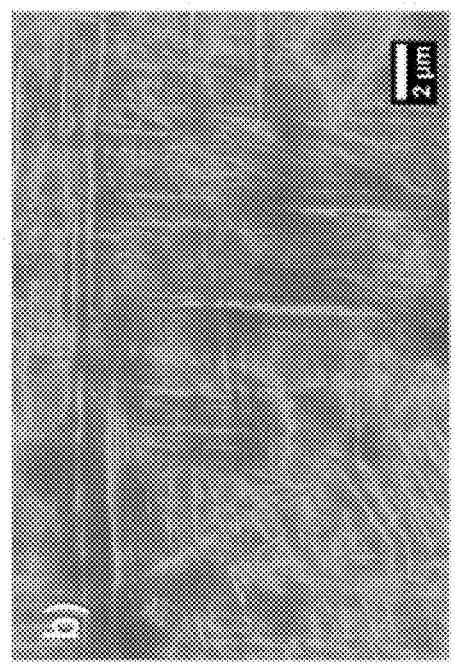
FIGS. 6A and 6B show SEM images of etched control build. The white linear regions are alpha phase Ti whereas the darker regions are beta phase Ti: (6A) low magnification Ti64, the dark circular splotches in the image are etching artifacts, (6B) high magnification Ti64.
Figure 6B:
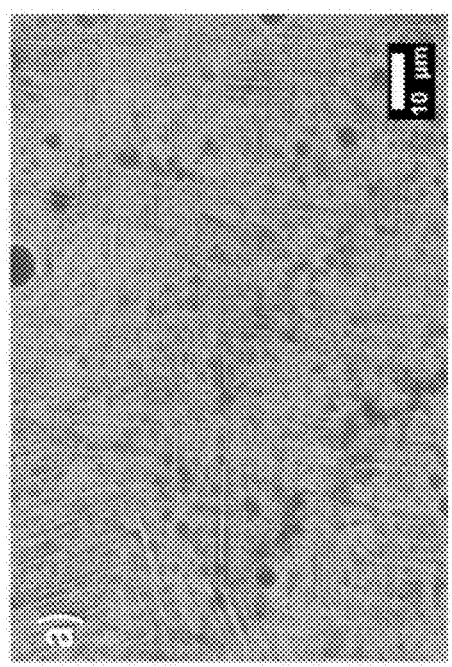

FIG. 6 shows the microstructure of Ti64 and the α and β phases of titanium were present, as expected given that Ti64 is an α+β titanium alloy. The β regions are the darker phase, and the α phases appear as the lighter, needle-like grains. The fact that there are α grains oriented in numerous directions indicates that material is isotropic in nature and thus will have similar properties in all directions.

Figure 7A:
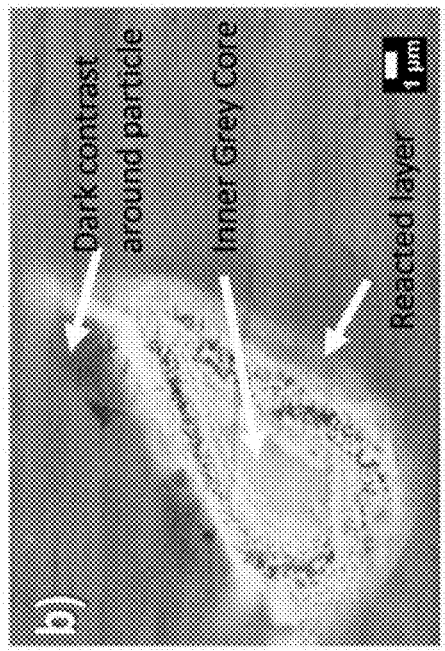
FIGS. 7A-7D show SEM micrographs of typical microstructural features seen in composite specimens (7A) discrete tantalum particles visible within TiTa1 build (arrows identify particle locations) (7B) reacted Tantalum particle TiTa3, porous outer layer is evidence of reaction. Darker phase surrounding porous layer suggest outward oxygen diffusion. Intermedia gray phase at the core suggest inward diffusion of light metal. (7C) agglomerated aluminum oxide in TiAl1, (7D) microcracking near agglomerates IN TiAl3 (Arrows in 7A, 7C and 7D denote oxides)
Figure 7B:
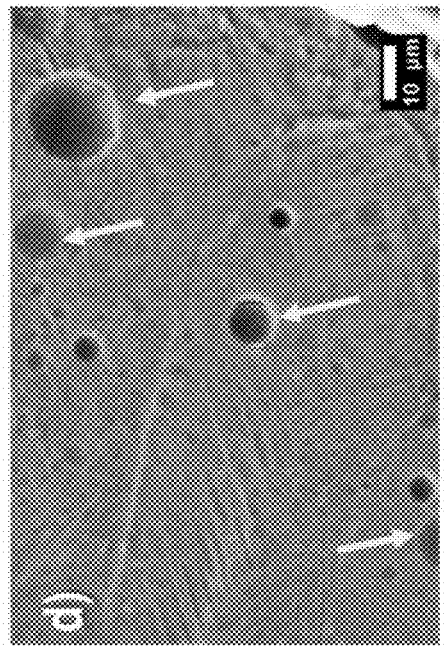

As seen in FIG. 7a, the microstructure of the Ti—Ta1 completed build closely resembled that of the control sample in terms of the orientation and amounts of both α and β phase present in the microstructure. In addition, $Ta_2O_5$ particulates are observed within the microstructure as discrete particles, thereby confirming that $Ta_2O_5$ is retained and embedded in Ti64 after the SLM process. FIG. 7b shows an embedded $Ta_2O_5$ particle exhibiting what appears to be a porous reacted layer. The oxide particle exhibits no porosity at the interface with Ti64, suggesting that the reaction may not be simply inter-diffusion between oxide and metal. The particulate is surrounded by a darker phase, suggesting outward diffusion of oxygen into the metal matrix. However, the core of the oxide particulate has a lighter grey contrast, suggesting possible inward diffusion of a lighter metal element such as Ti, Al, or V and/or loss of oxygen from the core. EDS analysis suggests that complete dissolution and subsequent reprecipitation of $Ta_2O_5$ may have occurred during the SLM process (FIGS. 8a-d). The lack of a clear reaction gradient in the compositional maps supports a dissolution-reprecipitation mechanism leading to the complex particulate structure, rather than inter-diffusion. The outer rim appears to be Ta metal as there is no overlapping O presence. Meanwhile, the interior consists of both tantalum and titanium oxides. It is postulated here that the laser interaction leads to temperature spikes that may induce dissolution of the oxide, which then leads to free oxygen being available to react with either Ta or Ti. The partial consumption of oxygen by titanium leads to some tantalum metal remaining free. Aside, from an increased presence of oxides, Ti—Ta3 had very similar microstructural characteristics to Ti—Ta1 and Ti64.

Figure 7C:
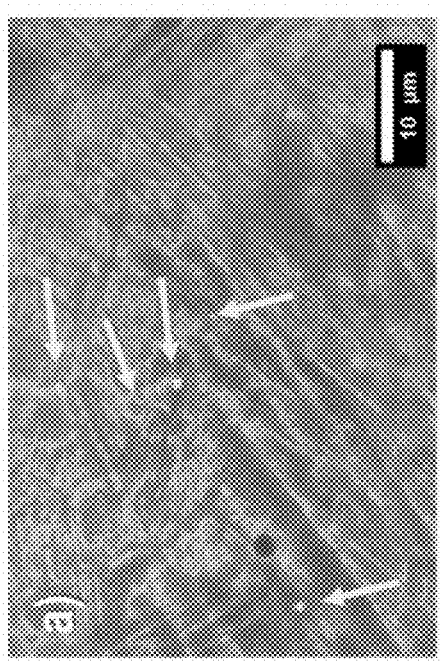
Figure 7D:
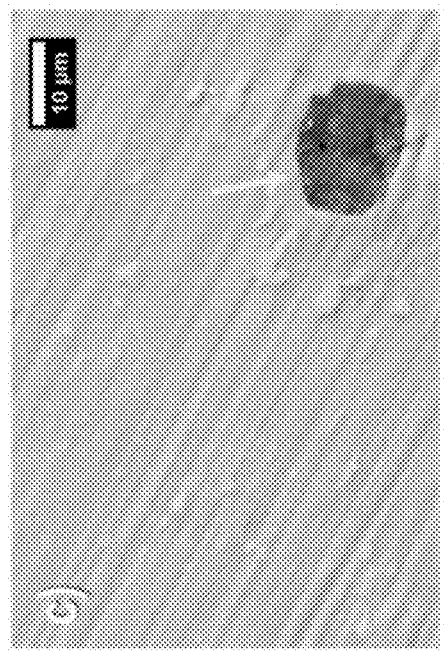
Figure 8A:
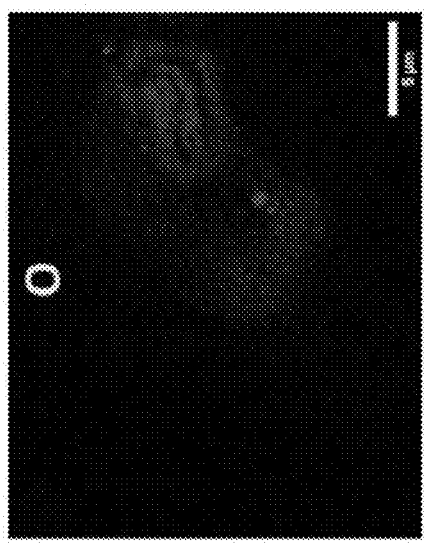
FIGS. 8A-8D show Energy-dispersive x-ray spectroscopy (EDS) mapping of Ta2O5 particulate in Ti—Ta3 composite showing signs of partial reaction, (8A) SEM image, (8B) oxygen map, (8C) tantalum map, (8D) titanium map.
Figure 8B:
Figure 8C:
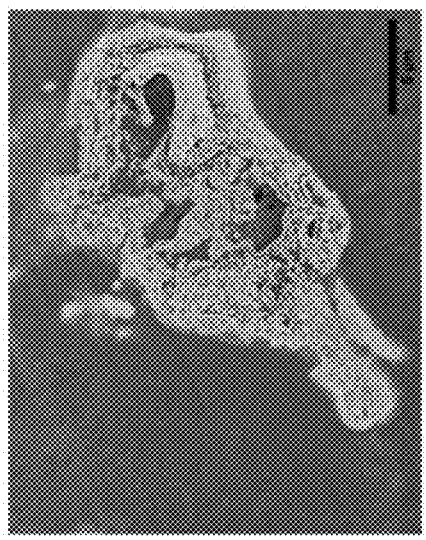
Figure 8D:
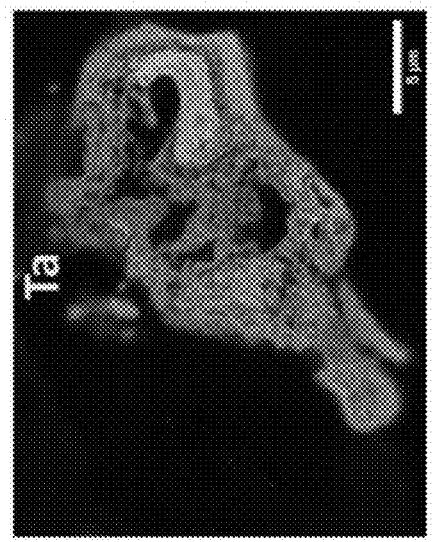

FIG. 7c shows an agglomerate of nano-$Al_2O_3$ within the Ti—Al1 sample, confirming retention of the oxide after SLM processing. Increased presence of agglomerated nano-$Al_2O_3$ was seen in Ti—Al3, as shown in FIG. 7d. While the α+β structure is still present, the nano-$Al_2O_3$ reinforced composites contain significant microporosity and micro cracks (in addition to significant macroscale porosity), in contrast to their $Ta_2O_5$ counterparts. Many of the microcracks appear within the nano-$Al_2O_3$ agglomerate or at the metal/oxide interface, evidence of poor interfacial bonding during SLM.

Figure 9:
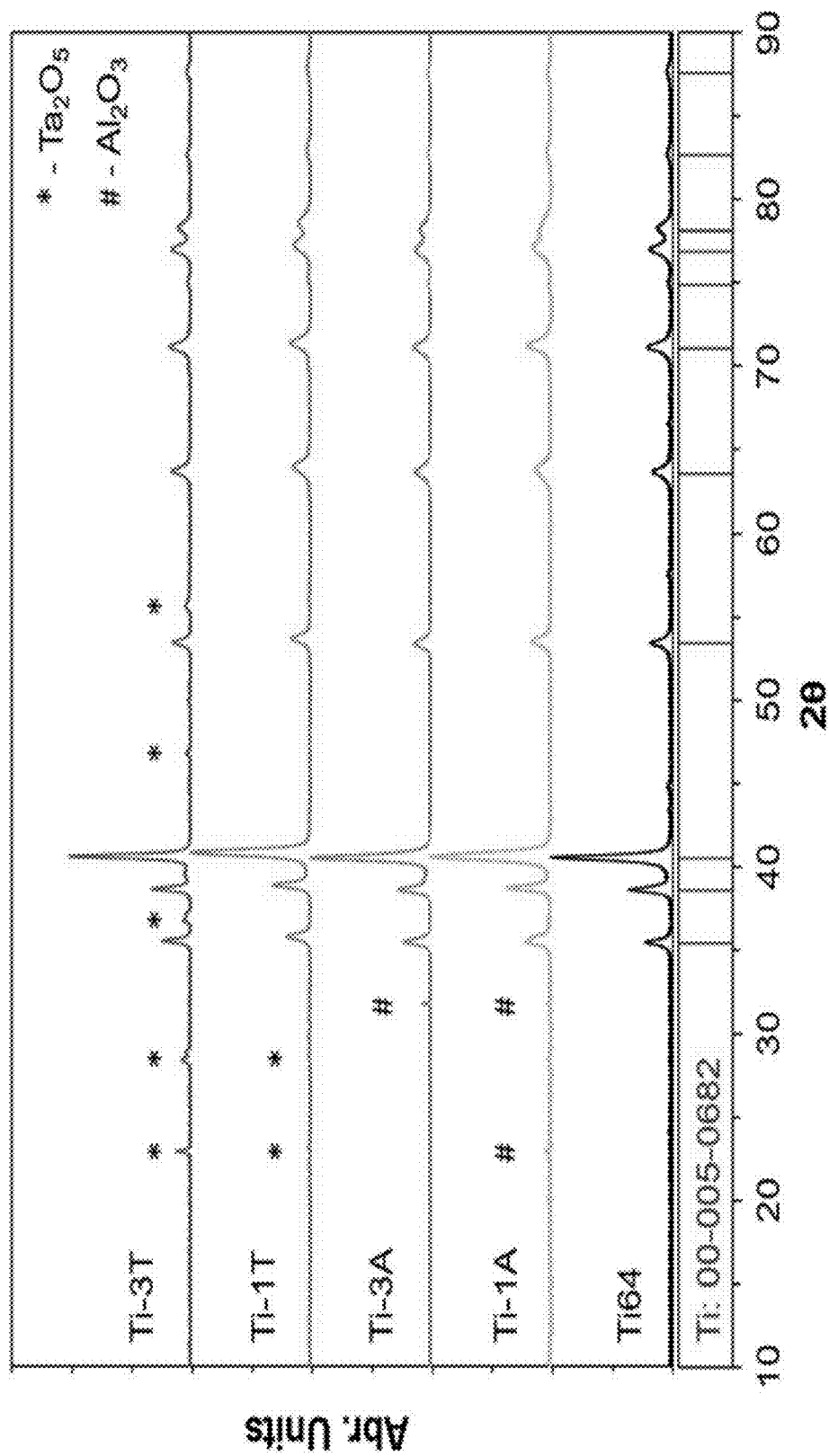
FIG. 9 shows X-ray diffraction (XRD) patterns of Ti64 and composite samples; composite samples show small peaks of oxide phases that confirm presence of oxide reinforcements after the SLM processing.
Figure 10A:
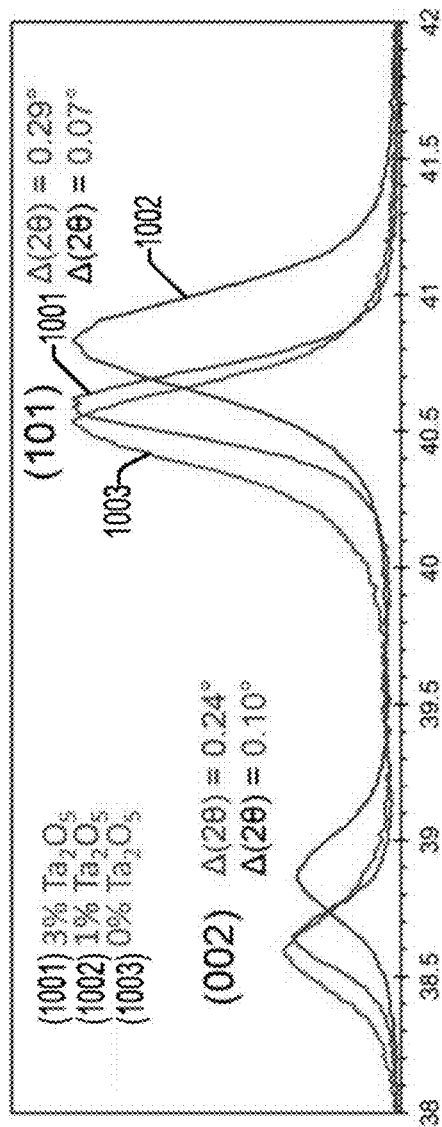
FIGS. 10A and 10B show (10A) XRD patterns focusing on peaks of Ti—Ta2O5 that show positive shift peaks relative to unreinforced Ti64, (10B) XRD patterns focusing on peaks of Ti—Al2O3 that show subtle peak shifts in composites relative to unreinforced Ti64.
Figure 10B:
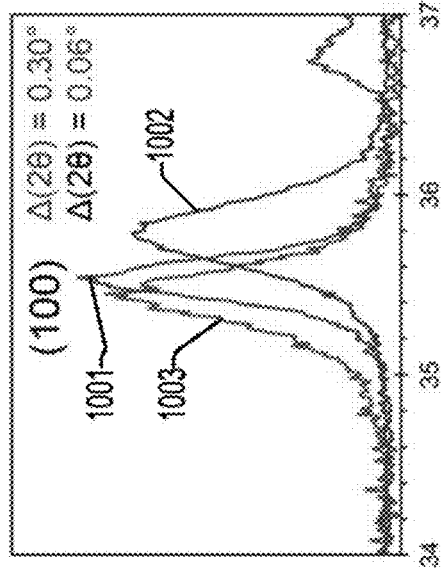
Figure 10B:
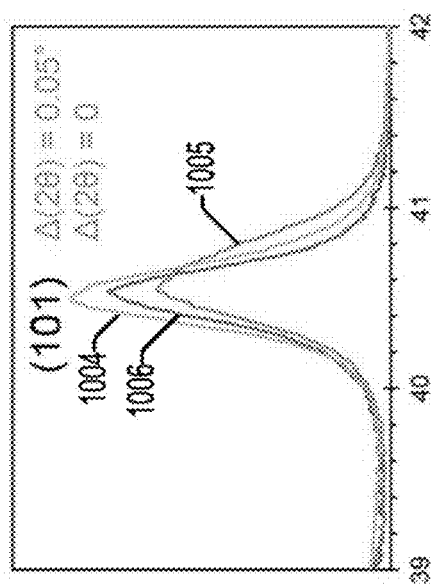
Figure 10B:
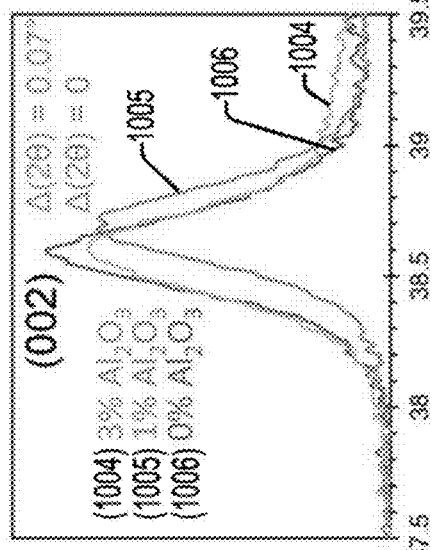
Figure 10B:
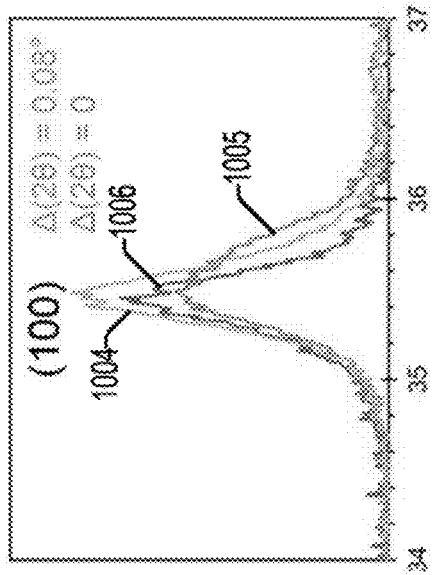

Despite the low volume fraction of oxides, XRD patterns of the composite samples confirmed the presence of the added oxides within the SLM produced builds (FIG. 9). In addition to expected Ti peaks, the composite samples show small peaks of either $Al_2O_3$ or $Ta_2O_5$. The presence of the oxides confirms that any dissolution was limited or was accompanied by reprecipitation. $Al_2O_3$ is well documented to react with Ti alloys by the diffusion of Al and O species. [Refs. 26-28] While Ti/$Al_2O_3$ diffusion couple and fiber/matrix reaction studies have been conducted at lower temperatures (<1250 C) than experienced during SLM (>1600 C), reactions are documented to occur in time periods of hours. For this reason, oxide particulates are not widely used to reinforce Ti composites produced by powder metallurgy [Refs. 29-31], which typically require extended periods under elevated temperature. The SLM process causes rapid melting and solification that likely provides insufficient time for diffusion-driven reactions between the oxide and Ti64. Diffusion studies are not available for $Ta_2O_5$, however, studies on other oxides such as $SiO_2$ and $Nb_2O_5$ have shown no reactivity between oxide particulate and matrix during conventional processing. [Refs. 32 and 33]

Another noteworthy observation is that the Ti peaks are shifted to the right in some of the composite samples. Peak shifts are shown in FIG. 10 and annotated in Table 1. Peak shifts are observed in both $Ta_2O_5$ reinforced samples, with the 1 vol. % reinforced sample exhibiting greater peak shifts. Peak shifts to the right are indicative of a contraction of the lattice spacing (Bragg's Law) that are the result of compressive stresses induced by the presence of the oxide particulates. The effectiveness of the oxides imparting compressive stresses that induce a peak shift are indicative of a strong interface between the titanium metal matrix and the oxide particulates. It is curious that the stresses are lower with 3 vol. % $Ta_2O_5$. This may be due in part to agglomeration that induces localized porosity (provides strain relief.). Similarly, in the nano-$Al_2O_3$ composites, a small positive shift (compressive stress) is observed in the 1 vol. % reinforced composites, but no shift is observed with 3 vol. % reinforcement. The smaller dimensions of the nano oxide phase may lead to lower thermal mismatch stresses with the titanium matrix.

TABLE 1

2-Theta Peak Shifts relative to Ti64 in Oxide Reinforced Composites

| Peak/Plane | Ti-Ta1 | Ti-Ta3 | Ti-Al1 | Ti-Al3 |
|---|---|---|---|---|
| (100) | 0.30 | 0.06 | 0.08 | — |
| (002) | 0.24 | 0.10 | 0.07 | — |
| (101) | 0.29 | 0.07 | 0.05 | — |
| (102) | 0.26 | 0.05 | 0.12 | — |
| (110) | 0.35 | 0.07 | 0.10 | — |
| (103) | 0.26 | 0 | 0.12 | — |

Mechanical Properties

Figure 11A:
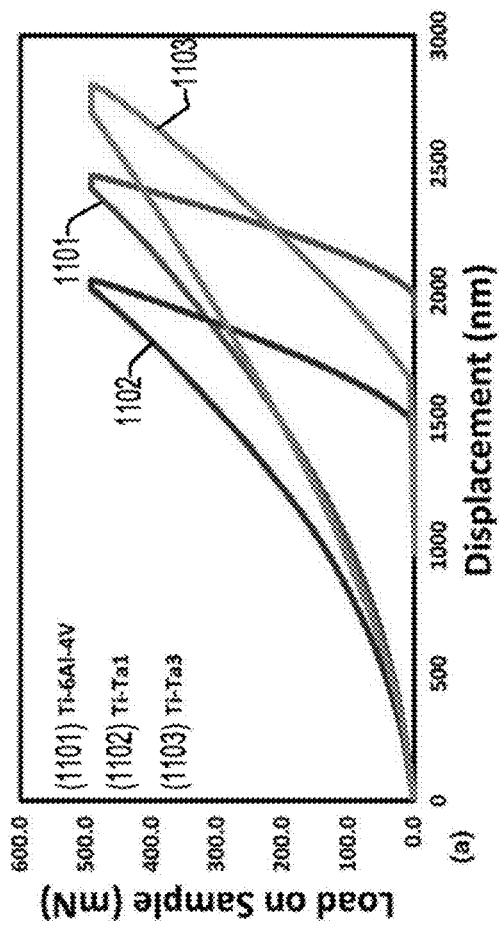
FIGS. 11A and 11B show Load-displacement curves for 500 mN loading indentation tests: (11A) Ti64 and Ti—Ta2O5, (11B) Ti64 and Al2O3. For clarity the control sample Ti64 is shown on both curves.
Figure 11B:
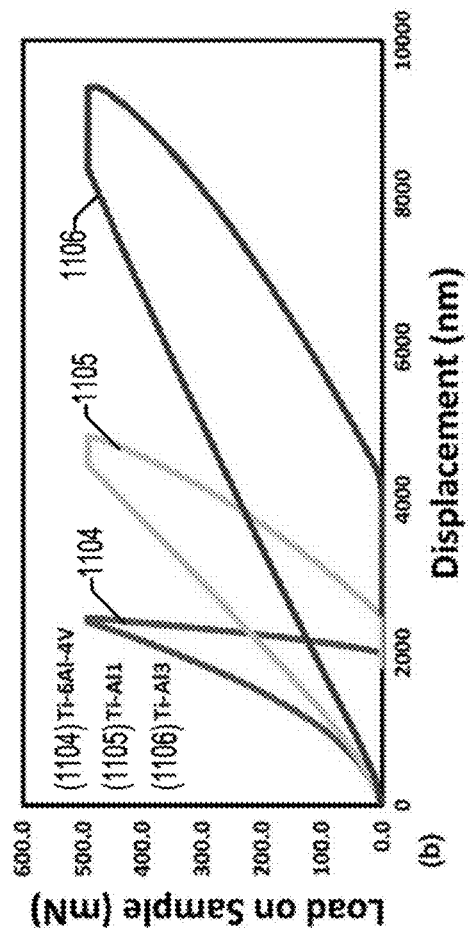
Figure 12A:
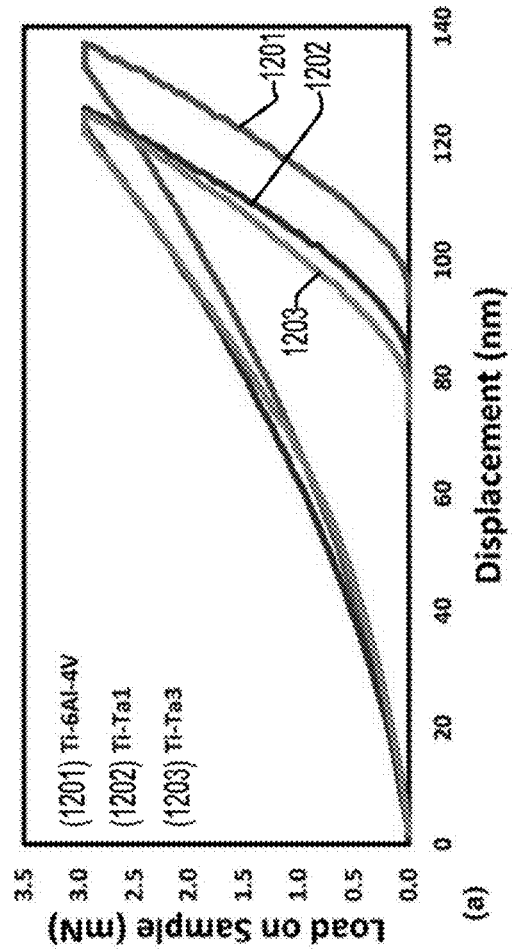
FIGS. 12A and 12B show Load-displacement curves for 3 mN loading nanoindentation tests: (12A) Ti64 and Ti—Ta2O5, (12B) Ti64 and Al2O3.
Figure 12B:
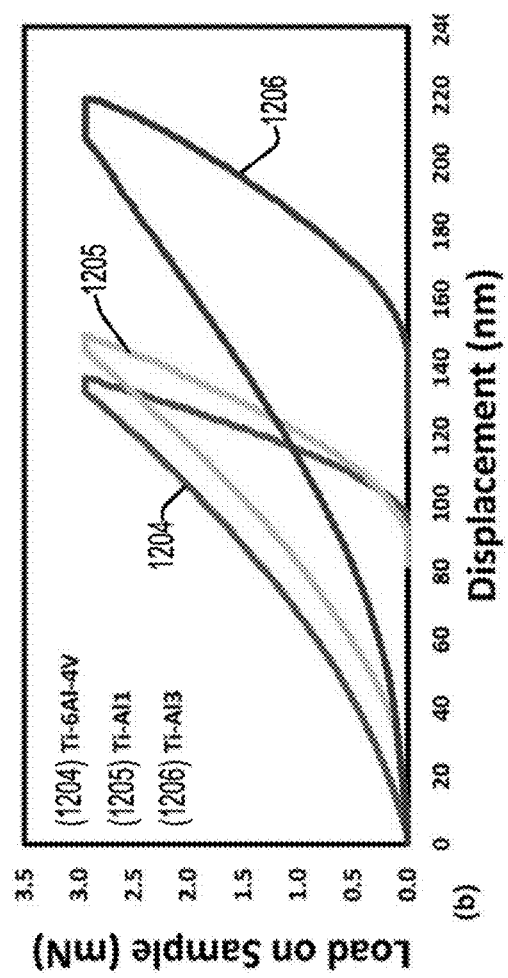

Mechanical properties were measured at multiple scale lengths (by controlling indentation depth) in order to evaluate the efficacy of the different reinforcement sizes and are tabulated in Tables 2 and 3. Representative load-displacement curves are shown for microindentation (FIGS. 11a-b) and nanoindentation (FIGS. 12a-b). A survey of the literature indicates that indentation testing of polycrystalline Ti64 (produced by conventional forging/rolling) yields elastic modulus values in the range of between 95-117 GPa. [Ref. 34] The results obtained in the present study for the control Ti64 sample in the 500 mN microindentation test was 112.7 GPa, well within the accepted literature values, indicating that the SLM processed Ti64 properties fell within the norm for conventionally processed Ti64. The low load (3 mN) nanoindentation test yielded a significantly higher modulus (140 GPa) due to the lower concentration of defects at very small volumes of material.

TABLE 2

Hardness and Elastic Modulus measured by microindentation (500 mN)

| Sample | Hardness (GPa) | Elastic Modulus (GPa) |
|---|---|---|
| Control | 4.46 +/− 0.29 | 112.66 +/− 2.09 |
| Ti-Ta1 | 6.07 +/− 0.20 | 116.12 +/− 0.09 |
| Ti-Ta3 | 4.23 +/− 0.08 | 41.77 +/− 0.04 |
| Ti-Al1 | 1.52 +/− 0.07 | 13.68 +/− 0.32 |
| Ti-Al3 | 0.41 +/− 0.03 | 3.38 +/− 0.15 |

TABLE 3

Hardness and Elastic Modulus measured by nanoindentation (3 mN)

| Sample  | Hardness (GPa) | Elastic Modulus (GPa) |
|---------|----------------|------------------------|
| Control | 6.21 +/− 0.76  | 140.37 +/− 10.86       |
| Ti-Ta1  | 7.77 +/− 0.43  | 148.92 +/− 5.41        |
| Ti-Ta3  | 9.26 +/− 1.32  | 144.08 +/− 12.61       |
| Ti-Al1  | 6.84 +/− 0.43  | 100.77 +/− 3.69        |
| Ti-Al3  | 2.31 +/− 0.34  | 58.13 +/− 5.03         |

Microscale indentation testing (500 mN load test) shows that the addition of only 1 vol. % $Ta_2O_5$ resulted in a 3.1% increase in modulus of elasticity and a 36% increase in hardness. A 6.1% increase in elastic modulus with the addition of $Ta_2O_5$ is measured in the low load (3 mN) nanoindentation tests. This is noteworthy as it implies that the reinforcement effect occurs even at a very small scale, suggesting a strong interface and adequate load transfer from the matrix to the oxide reinforcement. It is noted that the standard deviation of the modulus of elasticity for the 3 mN nanoindentation tests are greater in all samples, including the control, due to local variations in phases ($\alpha/\beta$), and localized porosity and surface roughness. The localized nature of strengthening is further supported by the retention of high elastic modulus in Ti—Ta3 and greater nanohardness than either Ti—Ta1 or Ti64. The load-displacement curves (FIG. 12) that the composite samples nearly overlap, reflecting fundamentally the same behavior at the nanoscale. However, as noted earlier, Ti—Ta3 experienced printing issues that led to a porous microstructure, and this was reflected in poor mechanical properties at the microscale (as measured by larger scale 500 mN tests). FIG. 11 shows that the relative amount of plastic deformation is much greater in Ti—Ta3, due to permanent deformation and collapse of the porous structure. In contrast, the relative percentage of plastic deformation in Ti64 and Ti—Ta1 is similar.

Both Ti—$Al_2O_3$ samples exhibited much lower hardness and elastic modulus when compared to the control sample during the microindentation tests. The use of nano-$Al_2O_3$ leads to increased melt pool splashing that can induce undesirable interfacial characteristics between the ceramic particulates and the metal matrix, including localized micro/nano scale porosity and un-melted particulates. Though limited evidence exists for this, during the printing process an increase in melt pool splashing was notable in these compositions. The porous structure in the resulting builds led to large amounts of plastic deformation as shown in FIG. 11 and low hardness and elastic modulus. At a more localized level, nanohardness values for Ti—Al1 were higher than that of Ti64, indicating that localized strengthening occurred. The decrease in elastic modulus even at the nanoscale indicates that load transfer between matrix and oxide is not adequate. Increasing nano-$Al_2O_3$ content did not translate to any improvement, even at the nanoscale. Load-displacement curves reflect fundamentally different deformation characteristics in Ti—Al3 as a significantly greater fraction of plastic deformation occurs. Instead, the increased nano-oxide content fueled greater melt pool splashing that adversely affected the build that led to more nano-scale porosity and increased plastic deformation.

Future work is planned to better characterize and quantify melt pool splashing and localized temperature spikes caused by the presence of oxides. Improvements in powder flowability and processing can overcome build problems and fully harness the reinforcement effects of higher oxide filler loading in SLM processed Ti-MMCs.

CONCLUSIONS

Oxide reinforced Ti64 composite powders are fabricated using HEBM to achieve good dispersion without chemically changing the makeup of the composite powder and are then printed via SLM. Incorporation of 1 vol. % of micro $Ta_2O_5$ particulates was fully successful using this methodology. However, the processing of nano-$Al_2O_3$, as well as greater volume fractions of oxides proved more challenging due to poor powder flowability induced by the dispersed oxides that decorate the surface of the Ti64 spherical powders. Melt pool splashing appeared to be induced by the nano-$Al_2O_3$, but no direct evidence was captured in the present study. Regardless, oxides were retained in the final builds and shifts in XRD peaks indicated compressive stresses on the matrix due to good interfacial bonding. Furthermore, incorporation of the oxides did not appear to affect the presence or relative fraction of $\alpha/\beta$ phase in Ti64. Mechanical property improvements are found to be length-scale dependent due to the macro-scale porosity in some of the partially completed builds. The fully completed Ti—Ta1 build exhibited an increased elastic modulus and hardness at both high load (500 mN) tests that are representative of microscale properties, and low load (3 mN) tests that are representative of localized nanoscale properties. The Ti—Ta3 only exhibited an improvement at the nanoscale due to macro porosity that led to increased plastic deformation. The nano-$Al_2O_3$ reinforced composites exhibited only a slight increase in hardness at the nanoscale when using 1 vol. % oxide. At greater length scales and oxide content significantly greater amount of plastic deformation occurred.

The methods illustrated throughout the specification, may be implemented in a computer program product that may be executed on a computer. The computer program product may comprise a non-transitory computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

What is claimed is:

1. A method of 3D printing oxide reinforced titanium composites comprising:
generating a composite powder by combining a titanium material and an oxide in ball mill, wherein the ball mill is used to perform multiple milling cycles at high energy, wherein each of the multiple milling cycles is at least one minute of milling followed by at least one minute of inactivity for cool-down, wherein the inactivity prevents melting of the composite powder;
retaining a spherical morphology, by the composite powder, of the titanium material, wherein each of the particles of the oxide are approximately from 1 μm to 20 μm;
configuring a custom support structure for supporting a metal component, wherein the custom support structure comprises large cylindrical support structures along an edge of a target print area of the metal component, wherein a diameter of each of the large cylindrical support structures is greater than or equal to 2 mm; and
printing, using a selective laser melting machine, the metal component and the custom support structure with the composite powder.

2. The method of claim 1, wherein the oxide is 1% by volume of $Al_2O_3$, 3% $Al_2O_3$, 1% by volume of $Ta_2O_5$, or 3% $Ta_2O_5$, and the titanium material is Ti-6Al-4V.

3. The method of claim 1, wherein the oxide is approximately 0.1% to 5% by volume of Al2O3 or Ta2O5.

4. The method of claim 1, wherein the custom support structure includes a plurality of different diameter cylinders.

5. The method of claim 1, the multiple milling cycles is at least ten milling cycles, and the selective laser melting machine is configured to have a target energy density that is low enough to ensure particulates of the oxide do not dissolve.

6. A method of 3D printing oxide reinforced titanium composites comprising:
generating a composite powder by combining a titanium material and an oxide in a ball mill, wherein the ball mill is used to perform multiple milling cycles at high energy, wherein each of the multiple milling cycles is approximately one to five minutes of milling followed by approximately one to ten minutes of inactivity for cool-down, wherein the inactivity prevents melting of the composite powder;
retaining a spherical morphology, by the composite powder, of the titanium material, wherein the oxide is a Ta2O5 oxide, wherein each of the particles of the oxide is approximately from 1 μm to 20 μm, and wherein poorer flowability results in a discontinuous powder bed;
configuring a custom support structure for supporting a metal component, wherein the custom support structure comprises large cylindrical support structures along an edge of a target print area of the metal component, wherein a diameter of each of the large cylindrical support structures is greater than or equal to 2 mm; and
printing, using a selective laser melting machine, the metal component and the custom support structure with the composite powder.

7. The method of claim 6, wherein the oxide is 1% by volume of Ta2O5, or 3% Ta2O5.

8. The method of claim 6, wherein the oxide is approximately 0.1% to 3% by volume of Ta2O5.

9. The method of claim 6, wherein the titanium material is Ti-6Al-4V.

10. The method of claim 6, the multiple milling cycles is at least ten milling cycles.

11. The method of claim 6, wherein the selective laser melting machine is configured to have a target energy density that is low enough to ensure particulates of the oxide do not dissolve.

12. A method of 3D printing oxide reinforced titanium composites comprising:
generating a composite powder by combining a titanium material and an oxide in a ball mill, wherein the ball mill is used to perform multiple milling cycles at high energy, wherein each of the multiple milling cycles is approximately one to five minutes of milling followed by approximately one to ten minutes of inactivity for cool-down, wherein the inactivity prevents melting of the composite powder;
retaining a spherical morphology, by the composite powder, of the titanium material, wherein the oxide is a nano-Al2O3 oxide that when combined with the titanium material is less disruptive of the spherical morphology, wherein each of the particles of the oxide is approximately 1 μm to 20 μm, and wherein poorer flowability results in a discontinuous powder bed;
configuring a custom support structure for supporting a metal component, wherein the custom support structure comprises large cylindrical support structures along an edge of a target print area of the metal component, wherein a diameter of each of the large cylindrical support structures is greater than or equal to 2 mm; and
printing, using a selective laser melting machine, the metal component and the custom support structure with the composite powder.

13. The method of claim 12, wherein the oxide is 1% by volume of Al2O3 or 3% Al2O3.

14. The method of claim 12, wherein the oxide is approximately 0.1% to 3% by volume of Al2O3.

15. The method of claim 12, wherein the titanium material is Ti-6Al-4V.

16. The method of claim 12, the multiple milling cycles is at least ten milling cycles.

17. The method of claim 12, wherein the selective laser melting machine is configured to have a target energy density that is low enough to ensure particulates of the oxide do not dissolve.

* * * * *